United States Patent [19]
Sawase et al.

[11] Patent Number: 5,454,762
[45] Date of Patent: Oct. 3, 1995

[54] HYDRAULIC CIRCUIT CONSTRUCTION FOR VEHICULAR LEFT/RIGHT DRIVE FORCE ADJUSTING APPARATUS

[75] Inventors: Kaoru Sawase, Anjo; Masayoshi Nishimori, Okazaki, both of Japan

[73] Assignee: Mitsubishi Jidosha Kogyo Kabushiki Kaisha, Tokyo, Japan

[21] Appl. No.: 66,119

[22] PCT Filed: Oct. 7, 1992

[86] PCT No.: PCT/JP92/01302

§ 371 Date: Aug. 3, 1993

§ 102(e) Date: Aug. 3, 1993

[87] PCT Pub. No.: WO93/07017

PCT Pub. Date: Apr. 15, 1993

[30] Foreign Application Priority Data

Oct. 8, 1991 [JP] Japan .................................. 3-289328
Oct. 8, 1991 [JP] Japan .................................. 3-289329

[51] Int. Cl.⁶ .................................................. F16H 1/44
[52] U.S. Cl. ........................... 475/84; 475/86; 475/250
[58] Field of Search ......................... 475/84, 86, 89, 475/128, 231, 233, 237, 239, 250

[56] References Cited

U.S. PATENT DOCUMENTS

| | | | |
|---|---|---|---|
| 4,735,110 | 4/1988 | Altenberg | 475/86 |
| 4,973,296 | 11/1990 | Shibahata | 475/231 |
| 5,133,696 | 7/1992 | Kobayashi | 475/86 |
| 5,141,072 | 8/1992 | Shibahata | 475/84 X |
| 5,370,588 | 12/1994 | Sawase et al. | 475/84 |

FOREIGN PATENT DOCUMENTS

| | | | |
|---|---|---|---|
| 56-101443 | 8/1981 | Japan . | |
| 62-35621 | 10/1987 | Japan . | |
| 1129087 | 12/1984 | U.S.S.R. | 475/86 |
| 1614953 | 12/1990 | U.S.S.R. | 475/84 |
| 2213443 | 1/1989 | United Kingdom . | |

*Primary Examiner*—Dirk Wright
*Assistant Examiner*—Kholo Ta

[57] ABSTRACT

Described is a hydraulic circuit construction of a vehicular left/right drive force adjusting apparatus suitable for use in adjusting drive force to left and right wheels in an automotive vehicle or the like. The vehicular left/right drive force adjusting apparatus is provided with a drive force transmission control mechanism which performs adjustment of drive force. The drive force transmitting apparatus is equipped with a left-wheel-controlling, hydraulically-driven clutch mechanism for transferring drive force to a left-wheel axle or from the left-wheel axle, a right-wheel-controlling, hydraulically-driven clutch mechanism for transferring drive force to a right-wheel axle or from the right-wheel axle, and a hydraulic circuit for driving these clutch mechanisms. This hydraulic circuit is constructed of hydraulic pressure adjusting device (74) for adjusting hydraulic pressure from hydraulic pressure source (73) and outputting the hydraulic pressure so adjusted, hydraulic pressure input devices (20D,20D) provided in association with the respective clutch mechanisms and adapted to be inputted with hydraulic pressure for the transmission of torque, and a change-over valve (76) interposed in lines extending from the hydraulic pressure adjusting device (74) to the respective hydraulic pressure input devices (20D,20D). The change-over valve (76) is designed to feed hydraulic pressure to one of the hydraulic pressure input devices (20D,20D) or a trouble judgment unit (78R,78L,72) is provided to judge any trouble in the hydraulic circuit, whereby the hydraulic pressure is controlled based on the judgment to avoid feeding of any undesired hydraulic pressure.

11 Claims, 21 Drawing Sheets

HYDRAULIC CIRCUIT CONSTRUCTION
FOR VEHICULAR LEFT/RIGHT DRIVE
FORCE ADJUSTING APPARATUS

DESCRIPTION

1. Technical Field

This invention relates to a vehicular left/right drive force adjusting apparatus suitable for use in the adjustment of drive force led by the distribution of drive force to left and right wheels in a 4WD automotive vehicle or the like, and especially to a hydraulic circuit construction for the apparatus.

2. Background Art

Recent years have seen major developments in 4WD automotive vehicles, including a variety for full-time 4WD automotive vehicles where improvements include positive adjustment of drive force such as the distribution of torque between front and rear wheels.

Taking in a broad sense a mechanism for distributing torque to left and right wheels in an automotive vehicle, on the other hand, it is considered to include conventional normal differentials as well as LSDs (limited slip differentials) including those of the electronic control type. They however do not positively adjust the distribution of torque, so that they cannot distribute torque between left and right wheels as desired.

Incidentally, it is desired for torque distribution mechanism that the distribution of torque can be effected as desired without inducing any large torque loss or energy loss. According to a mechanism as will be described next by way of example, the distribution of torque to left and right wheels can be adjusted as desired while reducing energy loss.

FIG. 15 is a schematic diagram showing the principle of a vehicular left/right drive force adjusting apparatus proposed from such a viewpoint in the course of the development of the present invention. Incidentally, the term "adjusting drive force" should be interpreted to embrace not only the distribution of drive force, which has been transmitted from an engine, to left and right wheels but also the transfer of torque between left and right, non-driven wheels so that negative drive force (in other words, brake force) is developed at one of the non-driven wheels while positive drive force is developed at the other non-driven wheel.

As is illustrated in FIG. 15, there are provided with an input shaft 1, to which rotational drive force (hereinafter called "drive force" or "torque") is inputted, and a first and second output axles 2,3 which output the drive force inputted from the input shaft 1. Among the first output axle 2, the second output axle 3 and the input shaft 1, a vehicular left/right drive force distribution apparatus is interposed as the vehicular left/right drive force adjusting apparatus.

The vehicular left/right drive force distribution apparatus, owing to the construction to be described next, can distribute drive force at a desired ratio to the first output axle 2 and the second output axle 3 while permitting differential motion between the first output axle 2 and the second output axle 3.

Between each of the first and second output axles 2,3 and the input shaft 1, a shift mechanism A and a multi-plate clutch mechanism B are interposed so that a rotational speed of the first output axle 2 or the second output axle 3 is increased by the corresponding shift mechanism A and is then transmitted to a sheath axle (hollow axle) 7 as a drive force transmitting auxiliary member.

The multi-plate clutch B, on the other hand, is interposed between the sheath axle 7 and a differential case 13 on the side of the input shaft 1. By causing the multi-plate clutch mechanism B to engage, drive force is returned from the sheath axle 7 on the side of a higher speed to the differential case 13 on the side of a lower speed because, as a general characteristic of clutch plates disposed in a face-to-face relationship, transmission of torque takes place from a faster side to a slower side.

When the multi-plate clutch mechanism B between the second output axle 3 and the input shaft 1 is brought into engagement, for example, a part of the drive force to be distributed to the second output axle 3 is therefore returned to the side of the input shaft 1 so that the drive force to be distributed to the second output axle 3 decreases. As a consequence, drive force to be distributed to the first output axle 2 increases correspondingly.

The shift mechanism A described above is constructed of a so-called double planetary gear mechanism composed of two planetary gear mechanisms linearly connected together. Taking by way of example the shift mechanism A arranged on the second output axle 3, a description can be made as will be set out next.

A first sun gear 4A is fixed on the second output axle 3. The first sun gear 4A is meshed at an outer periphery thereof with a first planetary gear (planetary pinion) 5A. The first planetary gear 5A is integrally connected to a second planetary gear 5B. Both the first planetary gear 5A and the second planetary gear 5B are rotatably supported via the pinion shaft 6A on a carrier 6 which is fixedly secured on a casing (a stationary part). The first planetary gear 5A and the secondary planetary gear 5B can therefore perform the same rotation about the pinion shaft 6A.

Further, the second planetary gear 5B is meshed with a second sun gear 4B rotatably supported on the second output axle 3 and the second sun gear 4B is connected to clutch plates 8A of the multi-plate clutch mechanism B via the sheath axle 7. Other clutch plates 8B of the multi-plate clutch mechanism B are connected to the differential case 13 driven by the input shaft 1.

In the construction of FIG. 15, the first sun gear 4A is formed greater in diameter than the second sun gear 4B and the first planetary gear 5A is formed smaller in diameter than the second planetary gear 5B. From a relationship between a number ratio of teeth of the first sun gear 4A to those of the first planetary gear 5A and a number ratio of teeth of the second sun gear 4B to those of the second planetary gear 5B, said number ratios being all determined depending on the diameters of the individual gears, the second sun gear 4B rotates at a faster speed than the first sun gear 4A so that the shift mechanism A serves as a speed increasing mechanism. When a rotational speed of the clutch plates 8A is faster than that of the clutch plates 8B and the multi-plate clutch mechanism B is brought into engagement, torque in a quantity corresponding to the state of the engagement is accordingly returned from the side of the second output axle 3 to the side of the input shaft 1.

On the other hand, the shift mechanism A and the multi-plate clutch mechanism B, both disposed on the first output axle 2, are constructed likewise. When it is desired to distribute more of drive torque from the input shaft 1 to the first output axle 2, the multi-plate clutch mechanism B on the side of the second output axle 3 is caused to engage suitably depending on the proportion desired to be distributed (distribution ratio). When it is desired to distribute more to the second output axle 3, on the other hand, the multi-plate clutch mechanism B on the side of the first output axle 2 is caused to engage suitably depending on the distribution ratio.

When each multi-plate clutch mechanism B is constructed as a hydraulically-driven multi-plate clutch mechanism, the state of engagement of the multi-plate clutch mechanism B can be controlled by regulating the level of hydraulic pressure and a return of drive force from the first output axle 2 or the second output axle 3 to the input shaft 1 (namely, a left-to-right distribution ratio of drive force) can be adjusted.

According to such an apparatus as described above, the distribution of torque is adjusted by transferring a desired amount of torque of one of wheels to the other torque instead of adjusting the torque distribution by using energy loss such as braking. A desired torque distribution ratio can therefore be achieving without inducing any substantial torque loss or energy loss.

The degree of engagement of the multi-plate clutch mechanism B is controlled by hydraulic pressure. As a simplest construction of its hydraulic circuit, the hydraulic circuit shown in FIG. 24 can be contemplated.

The hydraulic circuit in FIG. 24 is constructed of a hydraulic source 90 for feeding working oil, a proportional valve 91R for controlling hydraulic pressure to a right-side multi-plate clutch BR (a right side will hereinafter be referred to as "BR" when left and right are distinguished from each other), a proportional valve 91L for controlling hydraulic pressure to a left-side multi-plate clutch BL (a left side will hereinafter be referred to as "BL" when left and right are distinguished from each other), and a controller 92 for controlling these units. By controlling the individual proportional valves 91R, 91L, the distribution of torque to the left and right wheels can be adjusted.

In a hydraulic circuit of the type shown in FIG. 24, there is the potential problem that, upon malfunction of a control system or upon valve sticking, both the left and right clutch mechanisms are caused to engage at the same time and are hence interlocked or even damaged.

There is the further potential problem that one of the clutches remains engaged to impair the stability of running.

In the hydraulic circuit of the type illustrated in FIG. 24, there is the possibility that, when one of constituent members of the hydraulic circuit becomes out of order, for example, working oil of an inappropriate hydraulic pressure may be fed to the hydraulic circuit and torque cannot be distributed at a desired ratio to the left and right wheels. Should working oil of a high pressure be fed simultaneously to the left and right clutches at this time, the clutches may be brought into an interlocked state similarly to the situation described above.

Further, the above-described hydraulic lines should be kept free from oil leakage or air mixing. For this purpose, it is sufficient if the above-described hydraulic lines can be completely sealed. To completely seal, however, each hydraulic line must be worked out, for example, from a block or the like by drilling and each connected part thereof must be formed into a sealed structure, thereby inevitably leading to higher cost and greater weight.

The present invention has been completed in view of the above-described problems, and has as an object the provision of a hydraulic circuit construction for a vehicular left/right drive force adjusting apparatus, which construction makes it possible to avoid feeding of any undesired hydraulic pressure, for example, simultaneous engagement or coupling of both left and right, hydraulically-driven clutch mechanisms, said simultaneous engagement or coupling being a potential cause for interlocking of wheels.

Another object of the present invention is to provide a hydraulic circuit construction for a vehicular left/right drive force adjusting apparatus, which construction can prevent one of left and right, clutch mechanisms from remaining engaged upon malfunction of the hydraulic circuit.

A further object of the present invention is to provide a hydraulic circuit construction for a vehicular left/right drive force adjusting apparatus, which construction can cope with a trouble in a hydraulic circuit to prevent a clutch from undesired engagement.

A still further object of the present invention is to provide a hydraulic circuit construction for a vehicular left/right drive force adjusting apparatus, which construction can readily and surely prevent mixing of air into a hydraulic circuit of the vehicular left/right drive force adjusting apparatus to sufficiently secure clutch controlling performance.

SUMMARY OF THE INVENTION

A hydraulic circuit construction according to the present invention (as described in claim 1) for a vehicular left/right drive force adjusting apparatus has a pair of axles integrally rotatable with left and right wheels, respectively, and a drive force transmission control mechanism interposed between the wheels. The drive force transmission control mechanism comprises a left-wheel-controlling, hydraulically-driven clutch mechanism for transferring drive force to the left-wheel axle or from the left-wheel axle, a right-wheel-controlling, hydraulically-driven clutch mechanism for transferring drive force to the right-wheel axle or from the right-wheel axle, and a hydraulic circuit for driving the clutch mechanisms. The hydraulic circuit comprises hydraulic pressure regulating means for regulating hydraulic pressure from a hydraulic pressure source and outputting the hydraulic pressure so regulated, hydraulic pressure input means provided in association with the clutch mechanism and adapted to be inputted with hydraulic pressure for the transmission of torque, and a change-over valve interposed in lines extending from the hydraulic pressure regulating means to the hydraulic pressure input means and capable of feeding hydraulic pressure to one of the hydraulic input means.

By a hydraulic drive through the hydraulic circuit, drive force is transferred to the side of the left wheel or from the side of the left wheel through the left-wheel-controlling clutch mechanism of the drive force transmission control mechanism or drive force is transferred to the side of the right wheel or from the side of the right wheel through the right-wheel-controlling clutch mechanism of the drive force transmission control mechanism, whereby the state of drive force to each of the left and right wheels can be adjusted to a desired state.

Upon the above adjustment, hydraulic pressure outputted from the hydraulic pressure source in the above hydraulic circuit is regulated to a suitable pressure via the hydraulic pressure regulating means and then guided to the change-over valve. By adjusting the state of the change-over valve, the above-described state of drive force to each of the left and right wheels is adjusted.

Since the change-over valve is constructed to feed hydraulic pressure to one of the left and right, hydraulic pressure input means, it is possible to avoid simultaneous feeding of hydraulic pressure to the left and right, hydraulic pressure input means.

Preferably, the change-over valve is constructed of a 2-mode change-over valve which takes one of a communicating mode in which a predetermined hydraulic pressure from the hydraulic pressure regulating means is fed to one of the hydraulic pressure input means and another communicating mode in which the predetermined hydraulic pressure is fed to the other one of the hydraulic pressure input means.

This makes it possible to avoid simultaneous feeding of hydraulic pressure to the left and right, hydraulic pressure input means, which would otherwise takes place for the mechanical structure of the change-over valve.

Further, the change-over valve may comprise a spool movable back and forth in an axial direction, a spring for biasing the spool in a desired direction, and a solenoid for driving the spool against the spring. The spool is provided with a first valve element for opening or closing the line to one of the hydraulic pressure input means and a second valve element for opening or closing the line to the other hydraulic pressure input means. A positional relationship between the first valve element and the second valve element is set so that the first valve element and the second valve element are not opened at the same time.

The change-over valve may preferably be constructed of a 3-mode change-over valve which takes one of three modes consisting of a communicating mode in which a predetermined hydraulic pressure is fed from the hydraulic pressure regulating means to one of the hydraulic pressure input means, another communicating mode in which the predetermined hydraulic pressure is fed to the other one of the hydraulic pressure input means and a closing mode in which the predetermined hydraulic pressure is fed to neither of the hydraulic pressure input means.

This also makes it possible to avoid simultaneous feeding of hydraulic pressure to the left and right, hydraulic pressure input means, which would otherwise takes place for the mechanical structure of the change-over valve.

The change-over valve takes the closing mode when the change-over valve is in a neutral position at which no drive force is applied. When no drive force is applied, neither of the left and right, hydraulic pressure input means are fed with any hydraulic pressure.

The 3-mode change-over valve comprises a spool movable back and forth in an axial direction, a pair of springs for biasing the spool from opposite ends thereof to the neutral position, a first solenoid for driving the spool so that the spool is biased toward one end thereof against the spring, and a second solenoid for driving the spool so that the spool is biased toward the other end against the spring. The spool is provided with a first valve element for closing the line to one of the hydraulic pressure input means when the spool is at the neutral position but for opening the line to the one of the hydraulic pressure input means when the spool is at a position biased toward the one end thereof and with a second valve element for closing the line to the other one of the hydraulic pressure input means when the spool is at the neutral position but for opening the line to the other one of the hydraulic pressure input means when the spool is located at a position biased toward the other end thereof.

Preferably, the hydraulic pressure regulating means and the change-over valve are accommodated within an oil compartment in which working oil is stored, whereby the hydraulic pressure regulating means and the change-over valve are submerged in the working oil.

Working oil leaked from any connected part in the hydraulic lines is therefore returned to the oil compartment and brought into a state stored there. In addition, no air is allowed to enter the hydraulic circuit.

Further, a hydraulically-driven multi-plate clutch is preferably used as the clutch mechanism.

In addition, a hydraulic circuit construction according to the present invention (as described in claim 8) for a vehicular left/right drive force adjusting apparatus has a pair of axles integrally rotatable with left and right wheels, respectively, and a drive force transmission control mechanism interposed between the wheels. The drive force transmission control mechanism comprises a left-wheel-controlling, hydraulically-driven clutch mechanism for transferring drive force to the left-wheel axle or from the left-wheel axle, a right-wheel-controlling, hydraulically-driven clutch mechanism for transferring drive force to the right-wheel axle or from the right-wheel axle, and a hydraulic circuit for driving the clutch mechanisms. The hydraulic circuit comprises hydraulic pressure regulating means for regulating hydraulic pressure from hydraulic pressure source and outputting the hydraulic pressure so regulated, hydraulic pressure input means provided in association with the clutch mechanism and adapted to be inputted with hydraulic pressure for the transmission of torque, a change-over valve interposed in lines extending from the hydraulic pressure regulating means to the respective hydraulic pressure input means, and control means for controlling the change-over valve. Hydraulic pressure detection means are interposed in the lines extending from the change-over valve to the respective hydraulic pressure input means. The control means is provided with trouble judgment means for judging any trouble in the hydraulic pressure circuit on the basis of information from the hydraulic pressure detection means.

Based on information about hydraulic pressure in the hydraulic pressure lines as detected by the hydraulic pressure detection means, it is judged by the trouble judging means whether or not there is a trouble in the hydraulic circuit portion extending from the change-over valve to the respective hydraulic pressure input means. Further, on the basis of the results of such a judgment, it is possible to avoid feeding of an undesired hydraulic pressure so that, for example, simultaneous engagement or coupling of both the left and right, clutch mechanisms, the simultaneous engagement or coupling being a potential cause for interlocking of the wheels, can be avoided.

In the above construction, a hydraulically-driven multi-plate clutch can also be used preferably as the clutch mechanism.

Furthermore, a hydraulic circuit construction according to the present invention (as described in claim 10) for a vehicular left/right drive force adjusting apparatus has a pair of axles integrally rotatable with left and right wheels, respectively, and a drive force transmission control mechanism interposed between the wheels. The drive force transmission control mechanism comprises a left-wheel-controlling, hydraulically-driven clutch mechanism for transferring drive force to the left-wheel axle or from the left-wheel axis, a right-wheel controlling, hydraulically-driven clutch mechanism for transferring drive force to the right-wheel axle or from the right-wheel axle, and a hydraulic circuit for driving the clutch mechanism. The hydraulic circuit comprises hydraulic pressure regulating means for regulating hydraulic pressure from a hydraulic pressure source and outputting the hydraulic pressure so regulated, hydraulic pressure input means provided in association with the hydraulically-driven clutch mechanism and adapted to be inputted with hydraulic pressure for the transmission of torque, a change-over valve interposed in lines extending from the hydraulic pressure regulating means to the hydraulic pressure input means, and control means for controlling the hydraulic pressure regulating means. Hydraulic pressure detection means is interposed in an output line from the hydraulic pressure regulating means. The control means is provided with trouble judgment means for judging any trouble in the hydraulic pressure circuit on the basis of information from the hydraulic pressure detection means.

Based on information about hydraulic pressure in the hydraulic pressure lines as detected by the hydraulic pressure detection means, it is judged by the trouble judging means whether or not there is a trouble in the hydraulic circuit portion extending from the hydraulic pressure control means to the change-over valve. Further, on the basis of the results of such a judgment, it is possible to avoid feeding of an undesired hydraulic pressure.

Here again, a hydraulically-driven multi-plate clutch can also be used preferably as the mechanism.

A hydraulic circuit construction according to the present invention (as described in claim 12) for a vehicular left/right drive force adjusting apparatus having input means adapted to be inputted with drive force, a pair of left and right output axles for outputting the drive force, which has been inputted to the input means, to left and right wheels, respectively, a differential mechanism arranged between the input means and the output axles, adapted to distribute the drive force to the respective output axles and permitting differential motion of the respective output axles. The drive force transmission control mechanism comprises a left-wheel-side shift mechanism for shifting a rotational speed of the left-wheel-side output axle, a right-wheel-side shift mechanism for shifting a rotational speed of the right-wheel-side output axle, a left-wheel-controlling, hydraulically-driven clutch mechanism interposed between the left-wheel-side shift mechanism and the input means or the right-wheel-side output axle and adapted to transfer drive force to the left-wheel-side output axle or from the left-wheel-side output axle, a right-wheel-controlling, hydraulically-driven clutch mechanism interposed between the right-wheel-side shift mechanism and the input means or the left-wheel-side output axle and adapted to transfer drive force to the right-wheel-side output axle or from the right-wheel-side output axle, and a hydraulic circuit for driving the hydraulically-driven clutch mechanisms. The hydraulic circuit comprises hydraulic pressure regulating means for regulating hydraulic pressure from a hydraulic pressure source and outputting the hydraulic pressure so regulated, hydraulic pressure input means provided in association with the left and right, hydraulically-driven clutch mechanisms, respectively, and adapted to be inputted with hydraulic pressure for the transmission of torque, and a change-over valve interposed in lines extending from the hydraulic pressure regulating means to the hydraulic pressure input means and capable of feeding hydraulic pressure to one of the hydraulic pressure input means.

Accordingly, drive force of the input shaft is transmitted through the differential mechanism to the left and right output axles disposed in a pair. Drive forces outputted to the respective output axles from the differential mechanism are adjusted to a desired distribution ratio by the drive force transmission control mechanism. This adjustment is effected at the drive force transmission control mechanism. By the shift mechanisms, a rotational difference is produced between a member on the side of each output axle and those on the side of the input means. By connecting the clutch mechanism arranged between the member on the side of each output axle and the member on the side of the input means, transmission of drive force is performed between these members so that the distribution of drive force to the left and right wheels can be adjusted.

Upon the above adjustment, hydraulic pressure outputted from the hydraulic pressure source in the above hydraulic circuit is regulated via the hydraulic pressure regulating means to a suitable pressure and then guided to the change-over valve. By adjusting the state of the change-over valve, the above-described state of drive force to each of the left and right wheels is adjusted.

Since the change-over valve is constructed to feed hydraulic pressure to one of the left and right, hydraulic pressure input means, it is possible to avoid simultaneous feeding of hydraulic pressure to the left and right, hydraulic pressure input means.

Preferably, the change-over valve is constructed of a 2-mode change-over valve which takes one of a communicating mode in which a predetermined hydraulic pressure from the hydraulic pressure regulating means is fed to one of the hydraulic pressure input means and another communicating mode in which the predetermined hydraulic pressure is fed to the other one of the hydraulic pressure input means.

This also makes it possible to avoid simultaneous feeding of hydraulic pressure to the left and right, hydraulic pressure input means, which would otherwise takes place for the mechanical structure of the change-over valve.

The above-described 2-mode change-over valve can comprise a spool movable back and forth in an axial direction, a spring for biasing the spool in a desired direction, and a solenoid for driving the spool against the spring. The spool is provided with a first valve element for opening or closing the line to one of the hydraulic pressure input means and a second valve element for opening or closing the line to the other hydraulic pressure input means. A positional relationship between the first valve element and the second valve element is set so that the first valve element and the second valve element are not opened at the same time.

Preferably, the change-over valve can be constructed of a 3-mode change-over valve which takes one of three modes consisting of a communicating mode in which a predetermined hydraulic pressure is fed from the hydraulic pressure regulating means to one of the hydraulic pressure input means, another communicating mode in which the predetermined hydraulic pressure is fed to the other one of the hydraulic pressure input means and a closing mode in which the predetermined hydraulic pressure is fed to neither of the hydraulic pressure input means.

This also makes it possible to avoid simultaneous feeding of hydraulic pressure to the left and right, hydraulic pressure input means, which would otherwise takes place for the mechanical structure of the change-over valve.

As the 3-mode change-over valve takes the closing mode in the neutral position where no drive force is applied to the change-over valve, neither of the left and right, hydraulic pressure input means are fed with any hydraulic pressure when no drive force is applied.

The above-described 3-mode change-over valve can comprise a spool movable back and forth in an axial direction, a pair of springs for biasing the spool from opposite ends thereof to the neutral position, a first solenoid for driving the spool so that the spool is biased toward one end thereof against the spring, and a second solenoid for driving the spool so that the spool is biased toward the other end against the spring. The spool is provided with a first valve element for closing the line to one of the hydraulic pressure input means when the spool is at the neutral position but for opening the line to the one of the hydraulic pressure input means when the spool is at a position biased toward the one end thereof and with a second valve element for closing the line to the other one of the hydraulic pressure input means when the spool is at the neutral position but for opening the line to the other one of the hydraulic pressure input means when the spool is located at a position biased toward the other end thereof.

Preferably, the hydraulic pressure regulating means and the change-over valve can be accommodated within an oil compartment in which working oil is stored, whereby the hydraulic pressure regulating means and the change-over valve are submerged in the working oil.

Accordingly, working oil leaked from any connected part in the hydraulic lines is therefore returned to the oil compartment and brought into a state stored there. In addition, no air is allowed to enter the hydraulic circuit.

Preferably, a hydraulically-driven multi-plate clutch can also be used as the clutch mechanism.

A hydraulic circuit construction according to the present invention (as described in claim 19) for a vehicular left/right drive force adjusting apparatus having input means adapted to be inputted with drive force, a pair of left and right output axles for outputting the drive force, which has been inputted to the input means, to left and right wheels, respectively, a differential mechanism arranged between the input means and the output axles, adapted to distribute the drive force to the respective output axles and permitting differential motion of the respective output axles, and a drive force transmission control mechanism interposed between the input means and the respective output axles, characterized in that the drive force transmission control mechanism comprises a left-wheel-side shift mechanism for shifting a rotational speed of the left-wheel-side output axle, a right-wheel-side shift mechanism for shifting a rotational speed of the right-wheel-side output axle, a left-wheel-controlling, hydraulically-driven clutch mechanism interposed between the left-wheel-side shift mechanism and the input means or the right-wheel-side output axle and adapted to transfer drive force to the left-wheel-side output axle or from the left-wheel-side output axle, a right-wheel-controlling, hydraulically-driven clutch mechanism interposed between the right-wheel-side shift mechanism and the input means or the left-wheel-side output axle and adapted to transfer drive force to the right-wheel-side output axle or from the right-wheel-side output axle, and a hydraulic circuit for driving the clutch mechanisms. The hydraulic circuit comprises hydraulic pressure regulating means for regulating hydraulic pressure from a hydraulic pressure source and outputting the hydraulic pressure so regulated, hydraulic pressure input means provided in association with the left and right, clutch mechanisms and adapted to be inputted with hydraulic pressure for the transmission of torque, a change-over valve interposed in lines extending from the hydraulic pressure regulating means to the respective hydraulic pressure input means, and control means for controlling the change-over valve. Hydraulic pressure detection means are interposed in the respective lines extending from the change-over valve to the hydraulic pressure input means. The control means is provided with trouble judgment means for judging any trouble in the hydraulic pressure circuit on the basis of information from the hydraulic pressure detection means.

Based on information about hydraulic pressure in the hydraulic pressure lines as detected by the hydraulic pressure detection means, it is judged by the trouble judging means whether or not there is a trouble in the hydraulic circuit portion extending from the change-over valve to the respective hydraulic pressure input means. Further, on the basis of the results of such a judgment, it is possible to avoid feeding of an undesired hydraulic pressure so that, for example, simultaneous engagement or coupling of both the left and right, clutch mechanisms, the simultaneous engagement or coupling being a potential cause for interlocking of the wheels, can be avoided.

Here again, a hydraulically-driven multi-plate clutch can preferably be used as the clutch mechanism.

A hydraulic circuit construction according to the present invention (as described in claim 21) for a vehicular left/right drive force adjusting apparatus having input means adapted to be inputted with drive force, a pair of left and right output axles for outputting the drive force, which has been inputted to the input means, to left and right wheels, respectively, a differential mechanism arranged between the input means and the output axles, adapted to distribute the drive force to the respective output axles and permitting differential motion of the respective output axles, and a drive force transmission control mechanism interposed between the input means and the respective output axles, characterized in that the drive force transmission control mechanism comprises a left-wheel-side shift mechanism for shifting a rotational speed of the left-wheel-side output axle, a right-wheel-side shift mechanism for shifting a rotational speed of the right-wheel-side output axle, a left-wheel-controlling, hydraulically-driven clutch mechanism interposed between the left-wheel-side shift mechanism and the input means or the right-wheel-side output axle and adapted to transfer drive force to the left-wheel-side output axle or from the left-wheel-side output axle, a right-wheel-controlling, hydraulically-driven clutch mechanism interposed between the right-wheel-side shift mechanism and the input means or the left-wheel-side output axle and adapted to transfer drive force to the right-wheel-side output axle or from the right-wheel-side output axle, and a hydraulic circuit for driving the clutch mechanisms. The hydraulic circuit comprises hydraulic pressure regulating means for regulating hydraulic pressure from a hydraulic pressure source and outputting the hydraulic pressure so regulated, hydraulic pressure input means provided in association with the left and right, clutch mechanism and adapted to be inputted with hydraulic pressure for the transmission of torque, a change-over valve interposed in lines extending from the hydraulic pressure regulating means to the hydraulic pressure input means, and control means for controlling the hydraulic pressure regulating means. Hydraulic pressure detection means is interposed in an output line from the hydraulic pressure regulating means. The control means is provided with trouble judgment means for judging any trouble in the hydraulic pressure circuit on the basis of information from the hydraulic pressure detection means.

Based on information about hydraulic pressure in the hydraulic pressure lines as detected by the hydraulic pressure detection means, it is judged by the trouble judging means whether or not there is a trouble in the hydraulic circuit portion extending from the hydraulic pressure control means to the change-over valve. Further, on the basis of the results of such a judgment, it is possible to avoid feeding of an undesired hydraulic pressure.

Preferably, a hydraulically-driven multi-plate clutch is also used as the clutch mechanism.

BRIEF DESCRIPTION OF THE DRAWINGS

FIG. 2 through FIG. 4 are drawings all illustrating the construction of essential parts of the vehicular left/right drive force adjusting apparatus equipped with the hydraulic circuit construction of the one embodiment of this invention, in which FIG. 2 is a cross-sectional view taken in the direction of arrows II—II in FIG. 11, FIG. 3 is a cross-sectional view taken in the direction of arrows III—III in FIG. 11, and FIG. 4 is a cross-sectional view taken in the direction of arrows IV—IV in FIG. 11.

DETAILED DESCRIPTION OF THE INVENTION

Figure 1:
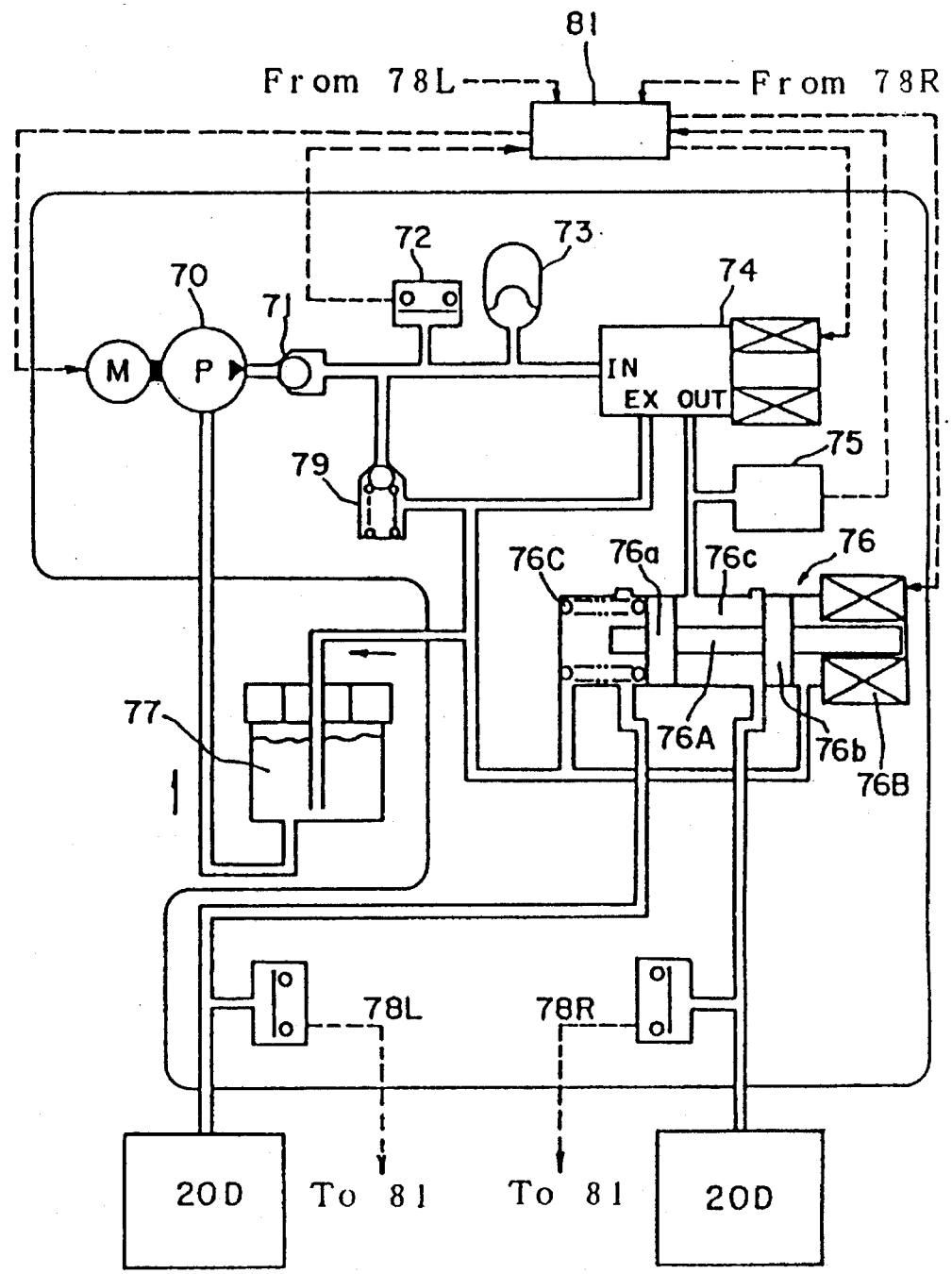
FIG. 1 is a schematic circuit diagram showing a hydraulic circuit construction according to one embodiment of this invention for a vehicular left/right drive force adjusting apparatus.

The hydraulic circuit construction according to the one embodiment of this invention for the vehicular left/right drive force adjusting apparatus will hereinafter be described with reference to the drawings.

The vehicular left/right drive force adjusting apparatus in this embodiment is adapted to perform adjustment of left and right drive forces for rear wheels in an automotive vehicle. In this embodiment, especially, the apparatus is arranged on a side of rear wheels of a 4WD vehicle and can receive drive force, which has been outputted to the side of the rear wheels through a center differential (illustration omitted) at an input shaft 1 via a drive shaft, and can then distribute the drive force to the left wheel and the right wheel.

As is shown in FIGS. 2 to 4, 11 and 15, this apparatus is provided to connect the input shaft 1, to which rotational drive force distributed to the side of the rear wheels out of an engine output of an automotive vehicle is inputted, with the first and second output axles 2,3 which serve to output the drive force inputted from the input shaft 1. The first output axle 2 is connected at a left end thereof with a drive system for a left wheel, while the second output axle 3 is connected at a right end thereof to a drive system for a right wheel.

Among a basal end of the first output axle 2, a basal end of the second output axle 3 and a rear end of the input shaft 1, a differential mechanism S1 and a drive force transmission control mechanism S are interposed. By these mechanisms, drive force to be transmitted to the first output axle 2 and the second output axle 3 can be distributed at a desired ratio while permitting a differential motion between the first output axle 2 and the second output axle 3.

In particular, the drive force transmission control mechanism S is provided with the shift mechanisms A and the multi-plate clutch mechanisms B as torque transmission mechanisms of the variable transmitted power amount control type. These shift mechanisms A and multi-plate clutch mechanisms B are interposed between the first output axle 2 and the input shaft 1 and between the second output axle 3 and the input shaft 1, respectively, so that a rotational speed of the first output axle 2 or the second output axle 3 is increased by the shift mechanism A and then transmitted to the sheath axle 7 as a drive force transmitting auxiliary member.

The multi-plate clutch mechanism B, on the other hand, is interposed between the sheath axle 7 and the differential case 13 on the side of the input axle 1. By causing the multi-plate clutch mechanism B to engage, drive force is returned from the sheath axle 7 on the side of a higher speed to the differential case 13 on the side of a lower speed because, as a general characteristic of clutch plates disposed in a face-to-face relationship, transmission of torque takes place from a faster side to a slower side.

When the multi-plate clutch mechanism B between the second output axle 3 and the input shaft 1 is brought into engagement, for example, a part of the drive force to be distributed to the second output axle 3 is therefore returned to the side of the input shaft 1 so that the drive force to be distributed to the second output axle 3 decreases. As a consequence, drive force to be distributed to the first output axle 2 increases correspondingly. When the multi-plate clutch mechanism B between the first output axle 2 and the input shaft 1 is brought into engagement, conversely, a part of drive force to be distributed to the first output axle 2 is returned to the side of the input shaft 1 so that the drive force to be distributed to the first output axle 2 decreases. As a consequence, drive force to be distributed to the second output axle 3 increases correspondingly.

The shift mechanism A described above is constructed of a so-called double planetary gear mechanism composed of two planetary gear mechanisms linearly connected together. Taking by way of example the shift mechanism A arranged on the second output axle 3, a description can be made as will be set out next.

A first sun gear 4A is fixed on the second output axle 3 by a spline and circlip 10. The first sun gear 4A is meshed at an outer periphery thereof with the first planetary gear 5A. The first planetary gear 5A is integrally formed with the second planetary gear 5B. Both the first planetary gear 5A and the second planetary gear 5B are formed as integral parts with the same number of teeth, that is, as a single planetary gear 5 in this embodiment.

These first planetary gear 5A and second planetary gear 5B are rotatably supported via the pinion shaft 6A on the carrier 6 which is fixed on the casing 11 of the shift mechanism A, whereby the first planetary gear 5A and the second planetary gear 5B can undergo the same rotation about the pinion shaft 6A.

Further, the second planetary gear 5B is rotatable in mesh with the second sun gear 4B. The second sun gear 4B is mounted on the cylindrical sheath axle 7 rotatably supported on the second output axle 3 and is connected via the sheath axle 7 to the clutch plates 8A of the multi-plate clutch mechanism B.

Here, the multi-plate clutch mechanism B is provided with the mutually opposing clutch plates 8A and clutch plates 8B which are accommodated in the differential case 13 inside a differential carrier 12. The clutch plates 8B are stopped from rotation by a ridge 13a formed on an inner peripheral wall of the differential case 13. Since a bevel gear (ring gear) 9A constituting a differential 9 is fixed on the differential case 13, the other clutch plates 8B in the multi-plate clutch mechanism B are connected via the differential case 13 and the bevel gear 9A to the bevel gear (drive pinion) 9B which makes up the rear end of the input shaft 1.

The input shaft 1 is hence connected to the clutch plates 8B via the bevel gear 9A, the bevel gear 9B and the differential case 13. In addition to a normal drive force transmission route which extends from the input shaft 1 to the first output axle 2 and the second output axle 3 via the bevel gear 9A, the bevel gear 9B, the differential case 13 and a differential mechanism 15, there is hence provided another drive force transmission route which extends from the first output axle 2 or the second output axle 3 to the side of the input shaft 1 via the shift mechanism A, the sheath axle 7, the multi-plate clutch mechanism B, the differential case 13, the bevel gear 9A and the bevel gear 9B.

Figure 11:
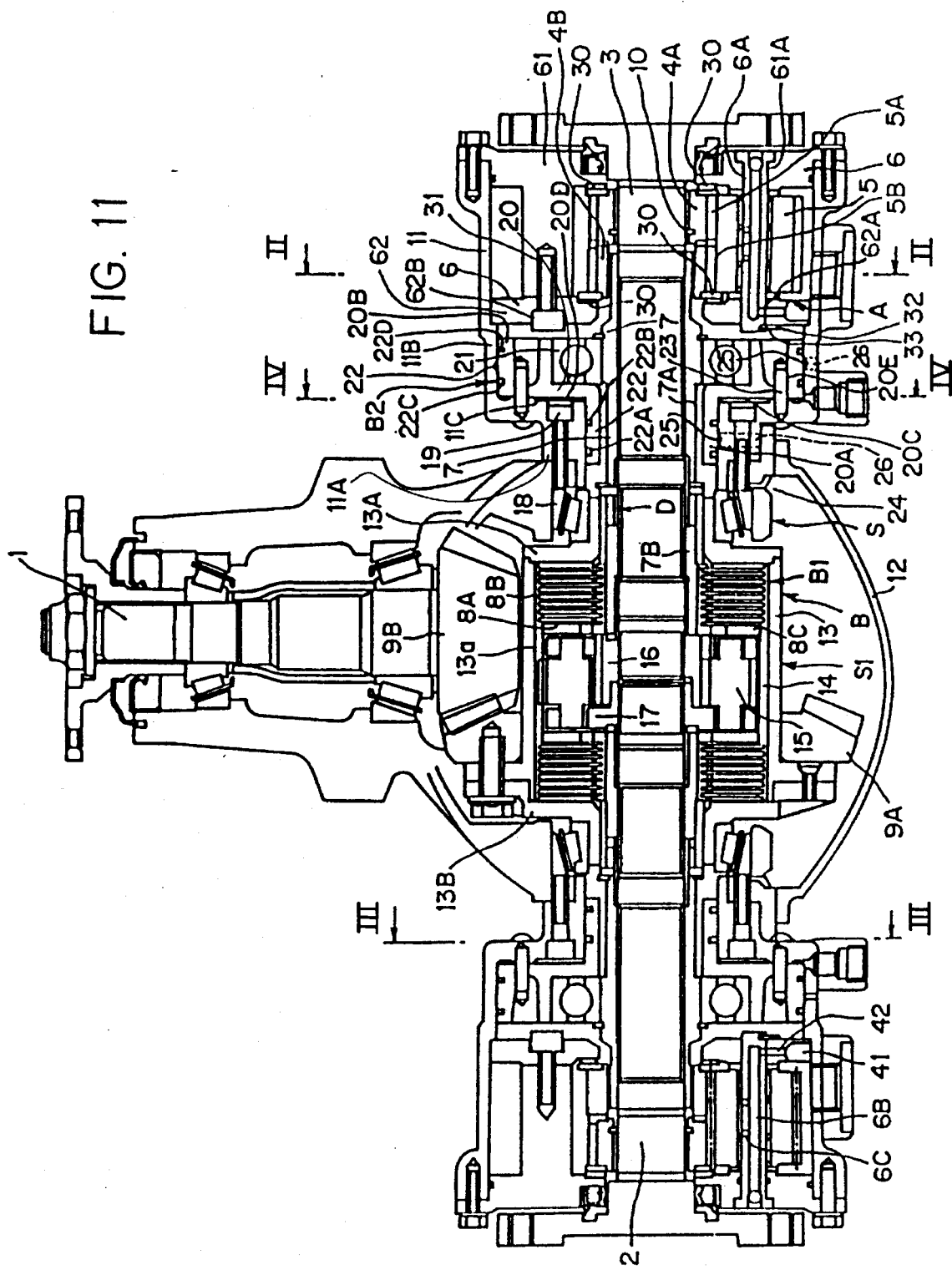
FIG. 11 is a transverse cross-sectional view showing as a revolved section a lower half part of the construction of an essential part of the vehicular left/right drive force adjusting apparatus equipped with the hydraulic circuit construction according to the one embodiment of the present invention.

In the construction of FIG. 11, the first gear 4A and the second sun gear 4B are formed with the same diameter but the first sun gear 4A is a profile shifted gear and has more teeth than the second sun gear 4B. Accordingly, a rotational speed of the second sun gear 4B is faster than that of the first sun gear 4A so that the shift mechanism A is constructed as a speed increasing mechanism. The clutch plates 8A therefore have a higher rotational speed than the clutch plates 8B so that, when the multi-plate clutch mechanism B is brought into a desired state of engagement, a desired amount of torque is returned from the side of the second output axle 3 toward the side of the input shaft 1.

The shift mechanism A and the multi-plate clutch mechanism B on the side of the first output axle 2 are similarly installed, whereby the transmission of torque from the first output axle 2 to the side of the input shaft 1 can be controlled.

The differential mechanism S1 which permits differential rotation between the first output axle 2 and the second output axle 3 is constructed by a planetary gear mechanism, whereby the multi-plate clutch mechanism B and the differential mechanism S1 are provided in a pair within the same differential carrier 12.

Namely, the planetary gear mechanism as the differential mechanism S1 is provided with a ring gear 14, a planetary gear 15 and a sun gear 16. The ring gear 14 is formed on an inner periphery of the differential case 13, the sun gear 16 is mounted on the second output axle 3, and a carrier 17 on which the planetary gear 15 is rotatably supported is mounted on the first output axle 2.

As a consequence, drive force inputted to the differential case 13 is inputted from the ring gear 14 to the planetary gear 15 and is then transmitted from the carrier 17 to the first output axle 2 and, further, is also inputted from the ring gear 14 to the sun gear 16 via the planetary gear 15 and then transmitted to the first output axle 2.

In the above planetary gear mechanism, the planetary gear 15 is constructed in the double type that two pinions of an inner pinion and an outer pinion are meshed and integrated with each other. These inner pinion and outer pinion are both supported rotatably on the carrier 17, the outer pinion is rotatable in mesh with the ring gear 14, and the inner pinion is rotatable in mesh with the sun gear 16. They are set so that the direction of rotation on the side of the sun gear 16 conforms with that of rotation on the side of the ring gear 14.

Although the differential mechanism S1 is disposed between the paired multi-plate clutch mechanisms B in the differential case 13, the differential mechanism S1 is constructed of a planetary gear mechanism and is hence compact in an axial direction so that the differential mechanism S1 and the multi-plate clutch mechanisms B are accommodated together within the conventional differential case 13. The differential carrier 12 in which the differential case 13 is accommodated is therefore constructed of conventional parts.

The hollow cylindrical differential case 13 is arranged with small-diameter portions at opposite ends thereof being rotatably supported via bearings 18 in openings at opposite ends of the differential carrier 12.

The multi-plate clutch mechanism B is provided with a clutch portion B1 and a piston portion B2 for driving the clutch portion B1. The clutch portion B1 has been constructed of clutch plates 8A and clutch plates 8B similar to those described above. The clutch portion B1 is disposed within the differential case 13, while the piston portion B2 is arranged outside the differential case 13.

In both opposite end openings of the differential carrier 12, casings 11 of the shift mechanisms A, said casings being formed as hollow cylinders, are fitted inwardly, and small diameter portions 11A at basal ends of the casings are tightened and fixed by bolts 19, respectively. Provided inside the small-diameter portion 11A at each basal end is a piston 20 which is provided with a sliding portion 20A extending along an inner wall of the small-diameter portion.

The piston 20 extends along the inner wall which in turn extends from the small-diameter portion 11A at the basal end of the casing 11 to a large-diameter portion 11B, and is formed as a stepped hollow cylinder equipped with the sliding portion 20A of small diameter and a sliding portion 20B of large diameter.

An annular vertical wall 20c located between the small-diameter sliding portion 20A and the large-diameter sliding portion 20B is constructed as a pressing wall. Between this pressing wall 20C and an inner wall 11C which extends from the basal end small-diameter portion 11A to the large-diameter portion 11B of the casing 11, a pressing operation compartment (pressing compartment) 20D is formed as hydraulic pressure input means.

To the pressurizing operation compartment 20D, an unillustrated hydraulic circuit is connected for feeding working oil thereto. Based on a control signal from a controller or the like, working oil of desired pressure is fed from the hydraulic pressure source to the pressurizing operation compartment 20D, so that the piston 20 is displaced over a desired distance.

The piston portion B2 of the multi-plate clutch mechanism B is formed in the casing 11 outside the differential case 13 as described above.

A description will now be made of the hydraulic circuit described above. The hydraulic circuit is provided with a electric pump 70 as a pressure source, a relief valve 79 for limiting below predetermined limit pressure working oil pressurized by the electric pump 70 and fed out through a check valve 71, an accumulator 73 for storing the pressurized working oil, a proportional solenoid (proportional valve) 74 as a hydraulic pressure regulating member for regulating the pressure of the working oil from the accumulator 73 and outputting the working oil, an on-off solenoid 76 as a change-over valve for feeding the working oil, whose pressure has been regulated by the proportional solenoid 74, to one of the left and right, pressurizing operation compartments 20D,20D, and an oil reservoir 77 from temporarily storing oil discharged from various parts.

In a hydraulic pressure line between a location where the above-described relief valve 79 is arranged and another location where the accumulator 73 is disposed, a pressure switch 72 is disposed as a hydraulic pressure detection means. Arranged in a hydraulic pressure line between the proportional valve 74 and the change-over valve 76 is a hydraulic pressure sensor 75 as hydraulic pressure detection means. Disposed further are a pressure switch 78R as hydraulic pressure detection means in a hydraulic pressure line between the above-described change-over valve 76 and the right-wheel pressurizing operation compartment 20D as well as a pressure switch 78L as hydraulic pressure detection means in a hydraulic pressure line between the above-described change-over valve 76 and the left-wheel pressurizing operation compartment 20D. In addition, a controller 81 is also provided to control these hydraulic units.

Accordingly, the working oil pressurized by the electric pump 70 is guided to the proportional valve 74 by way of the check valve 71, the pressure switch 72 and the accumulator 73 and, further, to the pressurizing operation compartment 20D for one of the left and right clutch pistons via the change-over valve 76.

The proportional valve 74 is a solenoid valve for regulating the pressure of working oil in accordance with a current fed thereto, and is controlled by the controller 81 so that working oil of desired hydraulic pressure can be outputted while being feed-back controlled based on a detection signal from the hydraulic pressure sensor 75. The pressure is regulated in proportion to a current so that, for example, the output hydraulic pressure becomes 0 when the feed current is 0 and the output hydraulic pressure becomes the maximum when the feed current is also the maximum.

Further, any failure of the proportional valve 74 can be judged by the hydraulic pressure sensor 75. During a failure of the proportional valve 74, it is possible to cope with the failure, for example, by controlling an output of the electric pump 70. Namely, the controller 81 is provided with a failure judgment unit (illustration omitted) which judges whether or not the proportional valve 74 is in failure while comparing a detection signal from the hydraulic pressure sensor 75 with that to the proportional valve 74. When the proportional valve 74 is judged to have failed by the failure judgment unit, control can still be effected to certain extent by adjusting hydraulic pressure by controlling an output from the electric pump 70.

The change-over valve 76 is a spool valve which, depending on the position of a spool 76A, communicates one of the oil compartment (pressurizing operation compartment) 20D for the left clutch and the oil compartment (pressurizing operation compartment) 20D for the right clutch with an output side of the proportional valve 74, and is driven by a solenoid 76B.

Two valve elements, that is, a first valve element 76a and a second valve element 76b are formed on the spool 76A, and a space 76c defined between these valve elements 76a and 76b is normally maintained in communication with the output side of the proportional valve 74. Further, one of the lines extending to the left and right oil compartments 20D,20D can be communicated to the space 76c.

When the solenoid 76B is not operated, the spool 76A is caused to retreat by biasing force of a return spring 76C (in the drawing, the right-hand side is to be considered as a rear side) so that the spool takes a position at which the space is communicated to the right oil compartment 20D. When the solenoid 76B is operated, the spool 76A is caused to advance against the return spring 76C so that the spool takes a position at which the space is communicated to the left oil compartment 20D.

The change-over valve 76 is designed to be controlled by the controller 81 so that the hydraulic pressure line is always communicated to only one of the left and right, pressurizing operation compartments 20D.

Further, the pressure switch 72 is an ON-OFF switch which allows a signal to flow to the controller 81 when hydraulic pressure of at least a predetermined value is applied. It is therefore possible to check the state of an output from the electric pump 70. Namely, the controller 81 is provided with the failure judgment unit (illustration omitted) which, depending on a detection signal from the pressure switch 72, judges whether the electric pump 70 is operating properly or is malfunctioned. When a failure (insufficient output) of the electric pump 70 is judged at the failure judging unit, a measure is taken such as controlling the proportional valve 74 accordingly or stopping the electric pump 70 so that distribution of any undesired torque can be avoided. In addition, when the electric pump 70 is operated excessively, the excess operation can be detected by means of the pressure switch 72. The proportional valve 74 is then controlled by the controller 81 to return any excess working oil to the oil reservoir 77. This makes it possible to avoid any unnecessary locking of the multi-plate clutch mechanisms B or any malfunction of the change-over valve 76.

The pressure switches 78R,78L are also designed to deliver a signal to the controller 81 when hydraulic pressure of at least a predetermined value is applied. It is hence possible to detect a failure of the change-over valve 76 or the like by checking if hydraulic pressure is applied to the hydraulic pressure line as controlled by the change-over valve 76. Namely, the controller 81 is provided with the failure judgment unit (illustration omitted) which, depending on a detection signal from the pressure switch 78R or 78L, judges whether the change-over switch 76 or the like is operating properly or is malfunctioned (for example, the hydraulic pressure line cannot be changed over). When a failure (or abnormality) of the change-over valve 76 or the like is judged at the failure judging unit, a measure is taken such as throttling the proportional valve 74 or stopping the electric pump 70 so that distribution of any undesired torque can be avoided.

The hydraulic lines are completely sealed to avoid oil leakage or air mixing. In the change-over valve 76, the spool 76A and the solenoid 76B are integrated to avoid oil leakage.

To form the whole hydraulic pressure lines in a oil-leakage-free structure, however, each hydraulic line must be worked out, for example, from a block or the like by drilling and each connected part thereof must be formed into a sealed structure, thereby inevitably leading to higher cost and greater weight.

Figure 12:
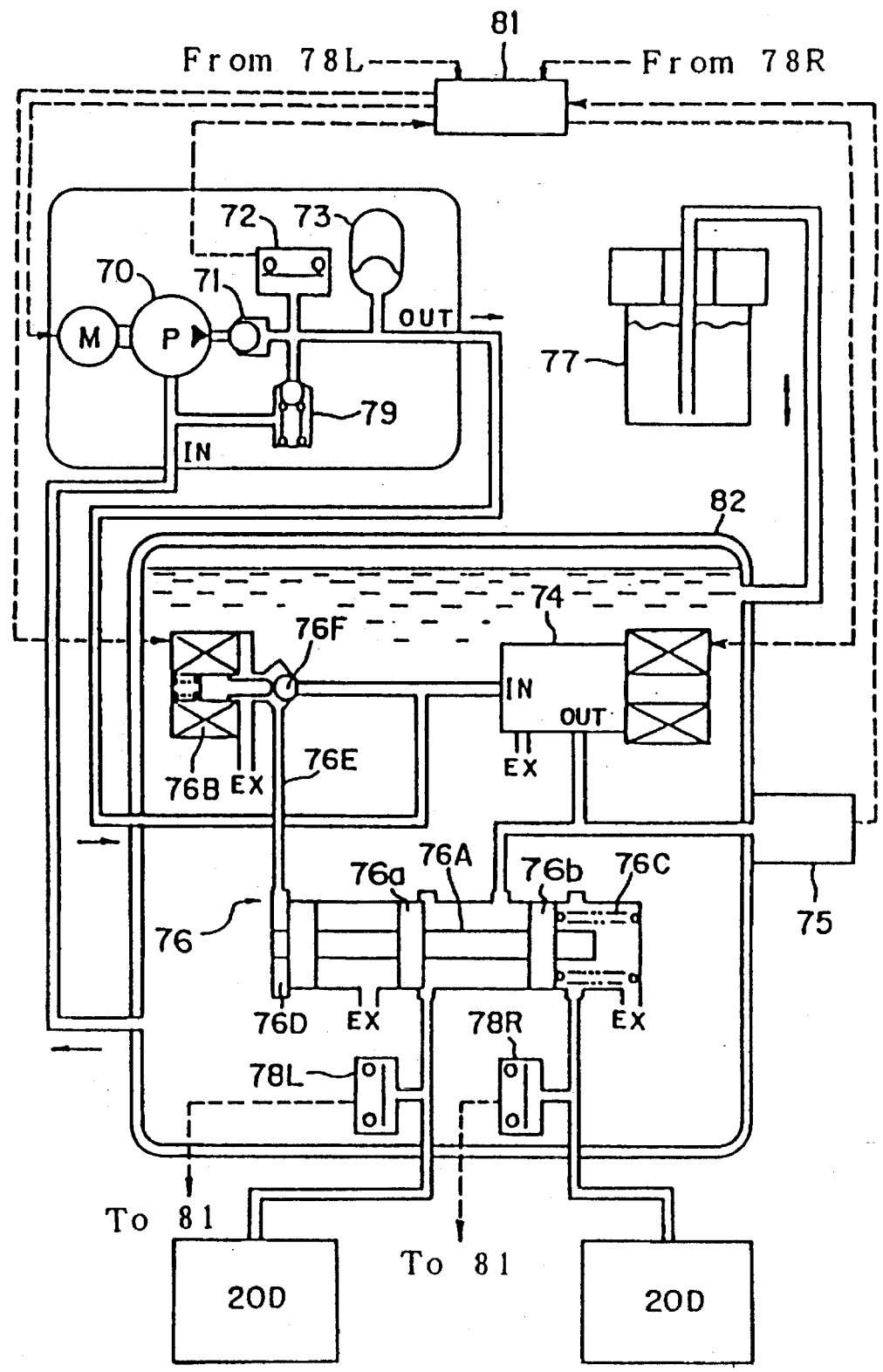
FIG. 12 illustrates an alternate embodiment with a hydraulic circuit which is modified from that which is shown in FIG. 1.

To meet such a requirement, the construction illustrated in FIG. 12 can be contemplated, which is different from the above-described hydraulic circuit of FIG. 1 in that the hydraulic circuit has been partly modified and a measure has been incorporated against oil leakage and air mixing.

The hydraulic circuit shown in FIG. 12 has the construction that a part of the hydraulic circuit is submerged within an oil tank 82 as an oil compartment, thereby making it possible to avoid mixing of air in any intermediary part of the hydraulic circuit and also to permit leakage of oil from hydraulic pressure lines. In the illustrated modification, parts involving the potential problem of oil leakage or air mixing, specifically the proportional valve 74 and the change-over valve 76 are submerged in the working oil stored inside the oil tank 82.

In the illustrated modification, the spool 76A and the solenoid 76B of the change-over valve 76 are provided as discrete members so that the solenoid 76B and the hydraulic circuit can be reduced in dimensions and the change-over valve 76 can be accommodated within the oil tank 82. Further, the oil tank 82 itself functions in a manner equivalent to the reservoir 77 in the hydraulic pressure system of the above embodiment, whereby the spool 76A can be driven while the working oil stored inside the oil tank 82 is fed suitably by the solenoid 76B.

For this purpose, an oil compartment 76D is formed on a side of an axial end of the spool 76A and a portion of the working oil is guided to the oil compartment 76D. A valve 76F driven by the solenoid 76B is disposed in an oil line 76E which extends to the oil compartment 76D. By opening the valve 76F through the solenoid 76B, the working oil is supplied to the oil compartment 76D so that the spool 76A is driven rightwards as viewed in the drawing.

Unless the oil compartment 76D is fed with the working oil, the spool 76A assumes a left-hand position as viewed in the drawing because of the return spring 76C.

Use of valve bodies of the A/T type (of the type designed for hydraulic pressure systems for controlling automatic transmissions), said A/T type involving some oil leakage, in the hydraulic pressure lines inside the oil tank 82 can achieve a reduction in both size and weight.

Figure 13:
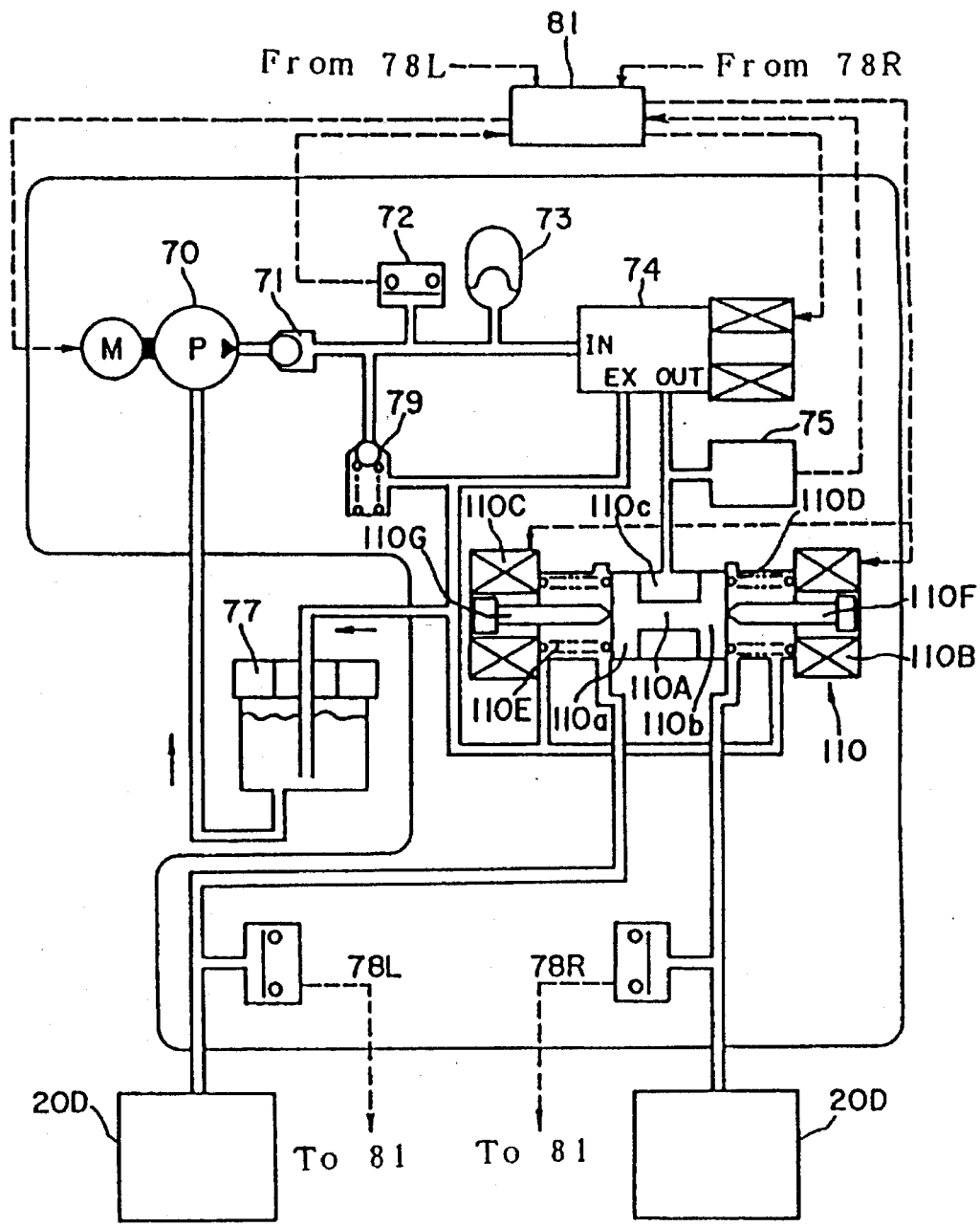
FIG. 13 illustrates an additional alternative hydraulic circuit.

Further, as shown in FIG. 13, it is also contemplated of constructing the above change-over valve by a 3-mode change-over valve which has a neutral mode in which working oil is not fed to any one of the left and right, pressurizing operation compartments 20D while no drive force is applied to the change-over valve.

This 3-mode change-over valve 110 can take three modes, that is, a communicating mode in which working oil whose pressure has been regulated by the proportional solenoid 74 is fed to one of the left and right, pressurizing operation compartments 20D,20D, another communicating mode in which the working oil is fed to the other pressurizing operation compartment, and a closing mode in which the working oil is not fed to any hydraulic pressure input means.

In this modification, the pressure switch 72 is also disposed in the hydraulic pressure line which extends the location where the relief valve 79 is arranged and the location where the accumulator 73 is disposed. Arranged in the hydraulic pressure line between the proportional valve 74 and the 3-mode change-over valve 110 is the hydraulic pressure sensor 75. Disposed further are the pressure switch 78R in the hydraulic pressure line between the above-described 3-mode change-over valve 110 and the right-wheel pressurizing operation compartment 20D as well as the pressure switch 78L in the hydraulic pressure line between the above-described 3-mode change-over valve 110 and the left-wheel pressurizing operation compartment 20D. In addition, the controller 81 is also provided to control these hydraulic units.

Accordingly, the working oil pressurized by the electric pump 70 is guided to the proportional valve 74 by way of the check valve 71, the pressure switch 72 and the accumulator 73 and, further, to the pressurizing operation compartment 20D for either the left or right clutch piston via the 3-mode change-over valve 110. As an alternative, the working oil is blocked by the 3-mode change-over valve 110 so that it is fed to neither the left nor the right pressurizing operation compartment 20D.

The 3-mode change-over valve 110 is a spool valve which, depending on the position of a spool 110A, can take three modes, that is, a mode in which the output side of the proportional valve 74 is communicated to the oil compartment (pressurizing operation compartment) 20D of the left clutch, another mode in which the output side of the proportional valve 74 is communicated to the oil compartment (pressurizing operation compartment) 20D of the right clutch, and a further mode in which the output side of the proportional valve 74 is not communicated to any one of the left and right, pressurizing operation compartments 20D. The 3-mode change-over valve is driven by a first solenoid 110B and a second solenoid 110C.

Two valve elements, that is, a first valve element 110a and a second valve element 110b are formed on the spool 110A, and a space 110c defined between these valve elements 110a and 110b is normally maintained in communication with the output side of the proportional valve 74. Accordingly, the space 110c is communicated to one of the oil lines extending to the left and right oil compartments 20D,20D, respectively, or is not communicated to any one of the oil lines.

When neither the solenoid 110B nor the solenoid 110C is operated, the biasing force of a return spring 110D and that of a return spring 110E are balanced so that the spool 110A moves inwardly to take a position at which the space is not communicated to any one of the oil lines to the left and right oil compartments 20D,20D. When one of the solenoids 110B,110C is operated, the spool 110A is caused to move against the biasing force of one of the return springs 110D, 110E to take a position at which the space is communicated to the oil line to one of the left and right oil compartments 20D,20D. When the solenoid 110B is operated, for example, the spool 110A is driven leftward as viewed in the drawing through a shaft 110F so that the space is communicated to the oil line to the left oil compartment 20D. When the solenoid 110C is operated, the spool 110A is driven rightward as viewed in the drawing through a shaft 110G so that the space is communicated to the oil line to the right oil compartment 20D.

The solenoids 110B,110C are operated under the control of the controller 81. The controller 81 controls them so that one of the solenoids 110B,110C is operated or none of the solenoids 110B,110C is operated. As a result, the 3-mode change-over valve 110 is designed to be communicated to only one of the hydraulic pressure lines to the left and right, pressurizing operation compartments 20D or not to be communicated to any one of the hydraulic pressure lines to the left and right, pressurizing operation compartments 20D.

Further, a hydraulic sensor 54, the pressure switches 72,78R,78L, the failure judgment unit of the controller 81, and the like are arranged as in the embodiment (the embodiment of FIG. 1) to permit judgment of a failure of the proportional valve 74, detection of a malfunction of the 3-mode change-over valve 110 or the like. As a consequence, when the proportional valve 74 is in failure, for example, the failure can be coped, for example, by controlling an output of the electric pump 70. When it becomes impossible to change over the hydraulic pressure lines to the left and right, pressurizing operation compartments 20D, for example, because of a malfunction of the 3-mode change-over valve 110, it is still possible to avoid distribution of undesired torque by controlling an output of the proportional valve 74 in accordance with the controller 81.

The hydraulic lines are completely sealed to avoid oil leakage or air mixing. In the 3-mode change-over valve 110, the spool 110A and the solenoids 110B,110C are integrated to avoid oil leakage.

To form the whole hydraulic pressure lines in a oil-leakage-free structure, however, each hydraulic pressure line must be worked out, for example, from a block or the like by drilling and each connected part thereof must be formed into a sealed structure, thereby inevitably leading to higher cost and greater weight.

Figure 14:
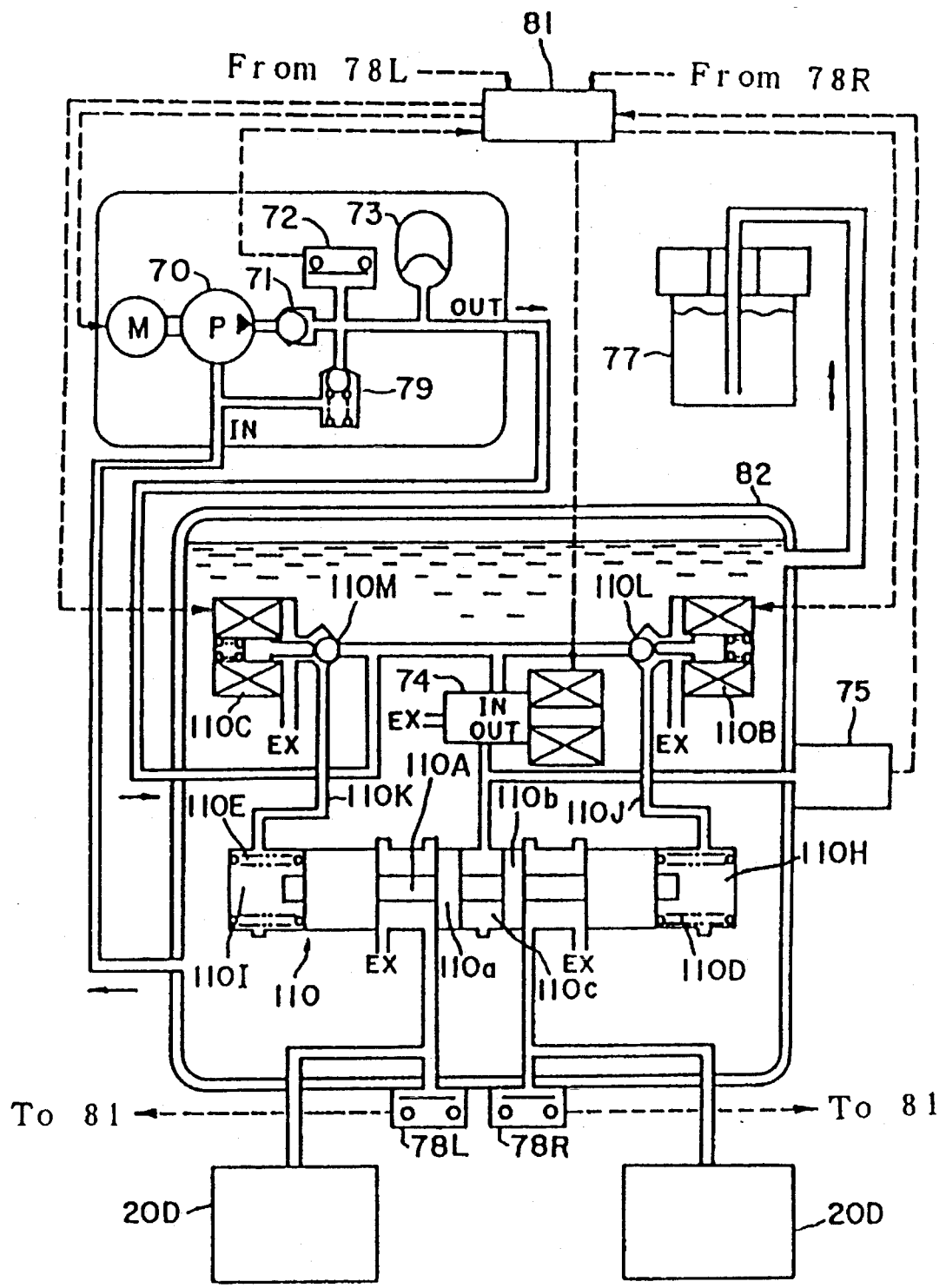
FIG. 14 illustrates a modified form of the hydraulic circuit of FIG. 13.

The construction illustrated in FIG. 14 can thus be contemplated, which is different from the hydraulic circuit of FIG. 13 in that the hydraulic circuit has been partly modified.

The hydraulic circuit shown in FIG. 14 corresponds to the hydraulic circuit of FIG. 12, and has the construction that a part of the hydraulic circuit is submerged within the oil tank 82, thereby making it possible to avoid mixing of air in any intermediary part of the hydraulic circuit.

In the illustrated modification, the spool 110A and the solenoids 110B,110C of the change-over valve 76 are provided as discrete members so that the solenoids 110B,110C and the hydraulic circuit can be reduced in dimensions. It is also designed that the spool 110A is driven by working oil which is fed by the solenoid 110B or 110C.

Oil compartments 110H,110I are therefore formed on sides of opposite axial ends of the spool 110A and a portion of the working oil is guided to the oil compartments 110H, 110I. Valves 110L,110M driven by the solenoids 110B,110C are disposed in oil lines 110J,110K which extend to the oil compartments 110H,110I, respectively. By opening the valve 110L or 110M, the working oil is supplied to the oil compartment 110H or 110I so that the spool 110A is driven either rightwards or leftwards from a neutral position as viewed in the drawing.

Unless the oil compartment 110H or 110I is fed with the working oil, the spool 110A is maintained at the neutral position by the return springs 110D,110E.

Use of valve bodies of the A/T type (of the type designed for hydraulic pressure systems for controlling automatic transmissions), said A/T type involving some oil leakage, in the hydraulic pressure lines inside the oil tank 82 can achieve a reduction in both size and weight.

A bearing 21 is fitted on the inner periphery of the large-diameter sliding portion 20B in the piston B2. Further, the sheath axle 7 is fitted on an inner periphery of the bearing 21. The sheath axle 7 is fixed on an inner ring of the bearing 21.

Namely, the piston B2 is disposed on the rotating part (sheath axle 7) via the bearing 21 outside the differential case 13. When the piston 20 is displaced, the sheath axle 7 is therefore also driven axially over a predetermined distance by way of the bearing 21.

The sheath axle 7 is connected to the clutch plates 8A in the multi-plate clutch mechanism B. When the sheath axle 7 is driven as described above, the clutch plates 8A are also displaced so that the multi-plate clutch mechanism B is suitably controlled from a released state, in which the clutch plates 8A and 8B are separated from each other, to a semi-engaged state in which the clutch plates 8A and 8B are suitably engaged with each other while sliding against each other, and further to a fully-engaged state in which the clutch plates 8A and 8B are completely engaged with each other.

The sheath axle 7 is connected at a free end thereof to the second sun gear 4B via a spline mechanism so that the sheath axle 7 is normally rotated at a speed shifted by the shift mechanism A. The piston 20, on the other hand, is constructed in a non-rotatable form so that it does not rotate, because the bearing 21 is interposed between the piston 20 and the sheath axle 7.

This is to maintain well the sealing structure 22 disposed between the piston 20 and the inner wall of the casing 11. The piston 20 desirously does not rotate at all. The piston 20 would however be frictionally induced to rotate together with the sheath axle 7 if the bearing 21 alone were interposed. The piston B2 is therefore provided with a limit mechanism C which limits relative rotation between the piston 20 and the casing 11 as a piston retainer.

The limit mechanism C is composed of a pin 23 and a guide hole 20E of the piston 20. The pin 23 axially extends at a right angle from the vertical inner wall 11C of the casing 11 toward the side of the piston 20 and is loosely inserted in the guide hole 20E. Upon displacement of the piston 20, rotation of the piston 20 is limited because the pin 23 is guided by the guide hole 20E.

Sealing structures 22 arranged between the piston 20 and the casing 11 are constructed as will be described next.

A lubricating operation compartment (operation compartment) 24 with lubricating oil (second fluid) stored therein is formed in such a way that the lubricating operation compartment is surrounded by the differential carrier 12 and the casing 11. The piston 20 with the sliding portions 20A,20B formed thereon is disposed inside the lubricating operation compartment 24 on the side of the casing 11. In particular, the sliding portion 20A is located in the small-diameter portion 11A at the basal end of the casing 11 while the sliding portion 20B is located in the large-diameter portion 11B of the casing 11. Formed between a stepped portion on an outer wall of the piston 20, said stepped portion being located between the sliding portion 20A and the sliding portion 20B, and a stepped portion on the inner wall 11C of the casing 11, said latter stepped portion being located between the small diameter portion 11A at the basal end and the large-diameter portion 11B, is the pressurizing compartment 20D which is divided from the lubricating operation compartment 24 and is fed with pressurized working oil.

The lubricating oil stored in the lubricating operation compartment 24 and the working oil stored in the pressurizing compartment 20D have different properties. It is hence necessary to prevent the lubricating oil from mixing in the working oil in the pressurizing compartment 20D or the working oil from mixing in the lubricating oil in the lubricating operation compartment 24. To ensure liquid tightness between the lubricating operation compartment 24 and the pressurizing compartment 20D, the sealing structures 22 are interposed between an inner wall of the operation compartment 24 (namely, the casing 11) and the sliding portions 20A,20B of the piston, respectively.

Each sealing structure 22 is formed of lubricating operation compartment sealings (sealings for the second liquid) 22A,22D disposed on the side of the lubricating operation compartment (on the side of the differential case 13, that is, on the side of the shift mechanism A) and pressurizing compartment sealings (sealings for the pressurized working oil) 22B,22C arranged on the side of the pressurizing compartment 20D. The lubricating operation compartment sealings 22A,22D and the pressurizing compartment sealings 22B,22C are arranged at an interval so that they do not interfere with each other within the ranges of their sliding motion.

Described specifically, the distances between the lubricating operation compartment sealings 22A,22D and the pressurizing compartment sealings 22B,22C are set at least as much as twice the stroke of the piston 20 so that, when the sealings 22A,22B,22C,22D slide on the inner wall of the casing 11, each oil scraped off from the inner wall does not penetrate the operation compartment on the side of the different oil.

The sealings 22A,22B,22C,22D are each formed of a D-ring fitted in a corresponding annular groove formed on the side of the piston 20. The D-ring is resistant to deformation upon sliding. The curved side of the D-ring is maintained in slidable contact with the inner wall 11C of the casing 11. The sealings are therefore prevented from self-rotation upon reciprocation of the piston 20.

In an inner wall of the lubrication operation compartment (casing 11), grooves 25 are formed over the entire periphery, corresponding to positions between the lubricating operation compartment sealings 22A,22D and the pressurizing compartment sealings 22B,22C. At lower parts of the inner wall of the lubricating operation compartment (casing 11), there are formed breeding passages 26 which extend from the respective grooves 25 to the outside of the casing 11.

The grooves 25 are arranged between the sliding range of the lubricating operation compartment sealing 22A and that of the pressurizing compartment sealing 22B and between the sliding range of the lubricating operation compartment sealing 22D and that of the pressurizing compartment sealing 22C at positions not interfering with the respective sliding ranges.

This is to retain oils, which have been scraped off by the individual sealings 22A,22B,22C,22D, in the corresponding grooves 25 so that the oil in the lubricating operation compartment 24 and that in the pressurizing compartment 20D are not mixed together. These sealings are also disposed in the hope that, even when one of the seals is broken, leaked oil is first retained in the groove 25 and is then discharged through the breeding passage 26, thereby permitting detection of the breakage of the sealing and preventing such mixed oil from flowing back to the side of the lubricating operation compartment 24 or the pressurizing compartment 20D.

Incidentally, the clutch portion B1 of the multi-plate clutch mechanism B is accommodated inside the differential case 13. Left and right end portions 13A,13B of the differential case 13 are however constructed as support members upon pressurization of the clutch B1.

As the clutch portion B1 of each multi-plate clutch mechanism B is arranged inside the differential case 13, a clutch hub 8C connected to the sheath axle 7 is arranged more centrally than the clutch portion B1 so that the clutch portion B1 is disposed between the clutch hub 8C and the end portion 13A or 13B of the differential case 13.

To press the clutch portion B1, the clutch hub 8C to be pressed by the piston 20 and a support member for bearing the pressing force are required. By using as pressing force pulling force which the piston 20 applies to the sheath axle 7, the end portion 13A or 13B of the differential case 13 can function as a support member.

As a consequence, no space is needed for the installation of such support members so that the apparatus has been reduced in dimensions.

The multi-plate clutch mechanism B is brought into engagement by pulling action of the sheath axle 7 as described above. From a requirement in assembly, the sheath axle 7 is constructed dividably into a piston-side member 7A and a clutch-side member 7B outside the differential case 13. The piston-side member 7A and the clutch-side member 7B are connected together by a connecting mechanism D upon assembly.

The connecting mechanism D is constructed as shown in FIG. 1 and FIGS. 5 to 10. The clutch-side member 7B is provided, at an end portion to be connected, with a hook 27 which is formed extending in the axial direction and, at a free end thereof, has a head portion 27A enlarged in a circumferential direction.

On the other hand, the clutch-side member 7B is provided, at an end portion to be connected, with an advancing channel 28 which is formed extending in the axial direction so that the advancing channel permits an axial advance of the hook 27 of the clutch-side member 7B.

Formed at an inner end of the advancing channel 28 is a fitting portion 28A in which the head portion 27A of the hook 27 is fitted when rotated in the circumferential direction.

Also provided is a ring 29 whose inner diameter is formed substantially equal to the outer diameter of the piston-side member 7A. A stopper 29A of a desired size is provided extending inwardly from an inner periphery of the ring 29. The stopper 29A is received in a space which is formed between the advancing groove 28 and the hook 27 upon fitting engagement between the head portion 27A of the hook 27 and the fitting portion 28A of the advancing groove 28. The stopper is therefore formed as a holding member which is adapted to hold the head portion 27A of the hook 27 and the fitting portion 28A of the advancing groove 28 in the fitted state.

The stopper 29A is formed so that it can be fitted and inserted in a retreating channel 27B formed in a basal portion of the piston-side member 7A, from which basal portion the hook 27 extends out, on a side where the head portion 27A is not formed. The axial depth of the retreating channel 27B is dimensioned to conform with the axial length of the stopper 29A.

The width of the advancing groove 28 in the piston-side member 7A is set to conform with the sum of the width of the stopper 29A in the ring 29 and the width of the hook 27 in the piston-side member 7A.

At a prescribed interval from the connected end of the piston-side member 7A, a snap ring fitting slot 27C is formed over the entire circumference. When the ring 29 is driven toward the clutch-side member 7B and the stopper 29A is received in the space between the advancing groove 28 and the hook 27, a snap ring 30 is fitted in the snap ring fitting slot 27C so that the stopper 29A is prevented from retreating toward the piston-side member 7A.

Owing to the construction described above, the connection between the piston-side member 7A and the clutch-side member 7B in the sheath axle 7 is conducted as will be described next.

Figure 7:
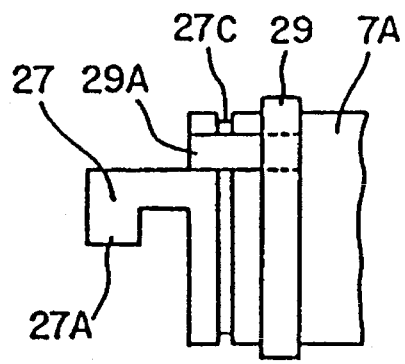
FIG. 7 is a schematic front view showing a first assembly step for the axle connecting mechanism of FIG. 5.

First, as shown in FIG. 7, the ring 29 is fitted on the piston-side member 7A, and the stopper 29A is caused to enter the retreating channel 27B and to retreat fully. As a result, the free end of the stopper 29A is registered with the free edge of the connected end of the piston-side member 7A.

Figure 8:
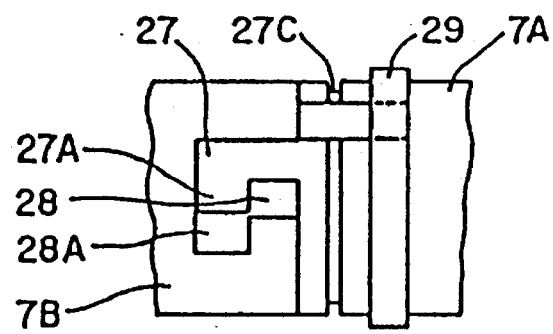
FIG. 8 is a schematic front view showing a second assembly step for the axle connecting mechanism of FIG. 5.
Figure 9:
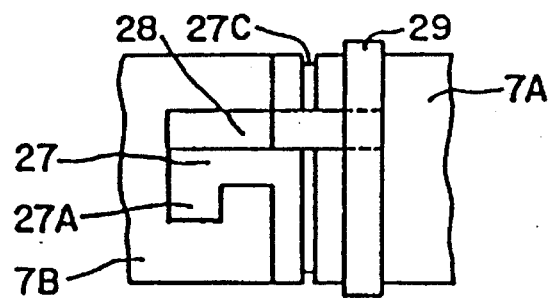
FIG. 9 is a schematic front view showing a third assembly step for the axle connecting mechanism of FIG. 5.

Next, as illustrated in FIG. 8, the hook 27 of the piston-side member 7A is caused to advance in the advancing channel 28 of the clutch-side member 7B and, when the hook has advanced fully, the piston-side member 7A and the clutch-side member 7B are rotated relative to each other so that, as depicted in FIG. 9, the head portion 27A of the hook 27 is fitted in the fitting portion 28A of the advancing channel 28.

Figure 10:
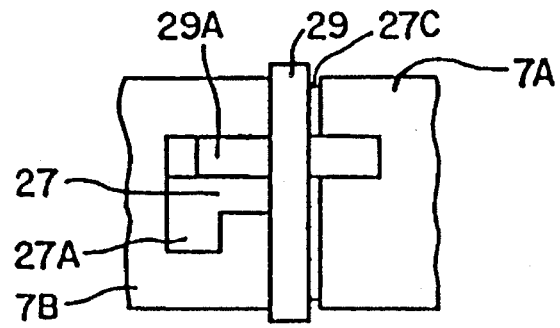
FIG. 10 is a schematic front view showing a fourth assembly step for the axle connecting mechanism of FIG. 5.

As a consequence, a space is formed behind the head portion 27A, namely, between the head portion 27A and the advancing channel 28. To make the stopper 29A advance into the space, the ring 29 is moved toward the clutch-side member 7B to have the stopper 29A received in the space as depicted in FIG. 10.

Further, the snap ring 30 is to be fitted in the snap ring fitting slot 27C. Since a rear end of the stopper 29A is located immediately ahead of the snap ring fitting slot 27C, the fitting work of the snap ring 30 is carried out readily.

Since the stopper 29A is prevented by the snap ring 30 from retreating toward the piston-side member 7A, the stopper 29A serves as a lock member for holding the head portion 27A of the hook 27 and the fitting portion 28A of the advancing channel 28 in the fitted state.

In other words, the advancing channel 28 is filled by the hook 27 and the stopper 29A and this state is maintained by the snap ring 30. Accordingly, transmission of rotational force between the piston-side member 7A and the clutch-side member 7B is therefore effected through the hook 27 and the stopper 29A whereas transmission of drive force in the axial direction between the piston-side member 7A and the clutch-side member 7B is performed through the engagement between the head portion 27A of the hook 27 and the fitting portion 28A of the advancing channel 28.

As has been described above, the connecting mechanism D is designed to permit transmission of both rotational force and axial force.

Figure 5:
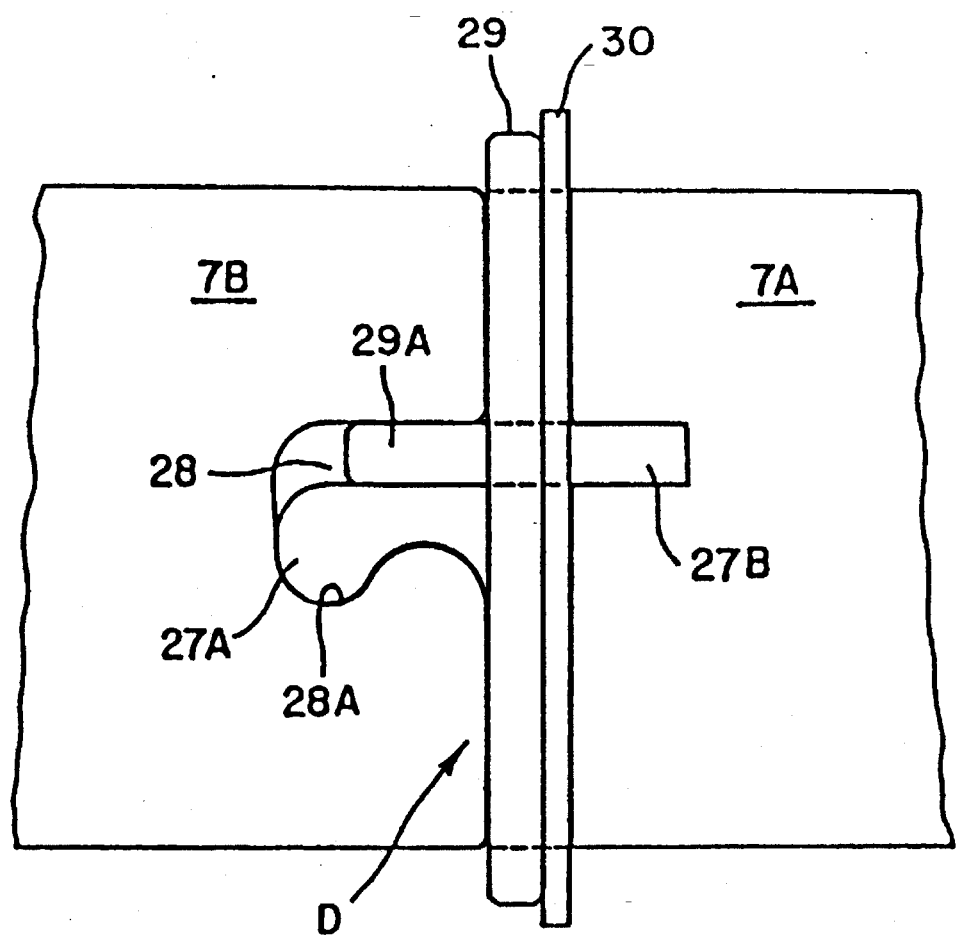
FIG. 5 is a fragmentary front view showing the construction of an axle connecting mechanism of the vehicular left/right drive force adjusting apparatus equipped with the hydraulic circuit construction according to the one embodiment of the present invention.
Figure 6:
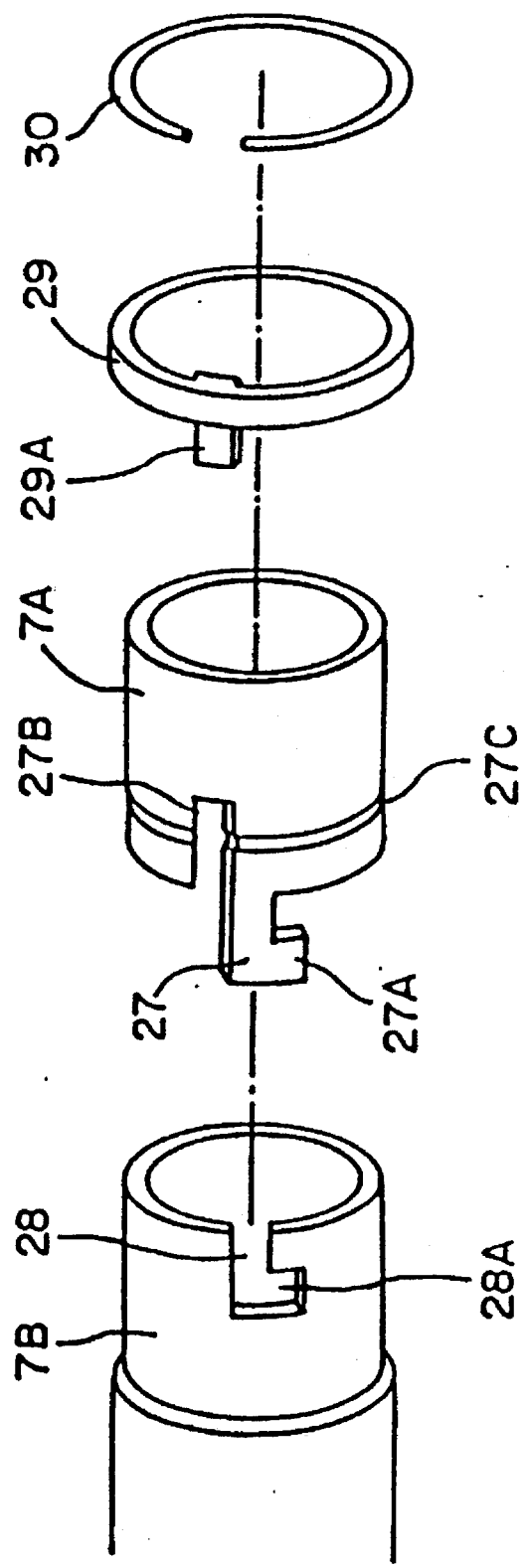
FIG. 6 is an exploded perspective view showing the construction of an essential part of the axle connecting mechanism.

Incidentally, the hook 27, the head portion 27A, the advancing channel 28 and the fitting portion 28A are each formed of a set of planes as illustrated in FIGS. 6 through 10. Besides, each of them can also be formed in a smoothly-curved configuration as shown in FIG. 5. In this case, the fitting between the head portion 27A and the fitting portion 28A can be achieved smoothly while being guided by their curved configurations.

The connecting mechanism D assembled as described above is arranged inside a bearing of the differential case 13. In the illustrated embodiment, as is shown in FIG. 1, the connecting mechanism D at the sheath axle 7 as a drive force transmitting auxiliary member and a piston drive force transmitting member is maintained in sliding contact with the bearing of the differential case 13 via a bushing 35, so that a peripheral wall of the connecting mechanism D is not brought into direct contact with the bearing.

Regarding the shift mechanism A, its outline has been described above. Its planetary gear mechanism will hereinafter be described in detail.

In the mechanism, the first sun gear 4A and the second sun gear 4B are meshed with the first planetary gear 5A and the second planetary gear 5B which are formed as an integral unit. Displacing force by the piston 20 is axially applied to the second sun gear 4B by way of the sheath axle 7.

It is therefore necessary to support the first planetary gear 5A, the second planetary gear 5B, the first sun gear 4A and the second sun gear 4B at axial opposite ends thereof. For this reason, they are held by the two-piece planetary carrier 6 (61,62) via the bearing 30 so that axial force is supported by the carrier 6.

The two-piece planetary carriers 6 (61,62) are fixed to each other by bolts 31. Further, pinion shaft mounting holes 61A,62A are formed in the planetary carriers 6 (61,62) to fit both opposite end portions of the pinion shaft 6A therein.

Figure 3:
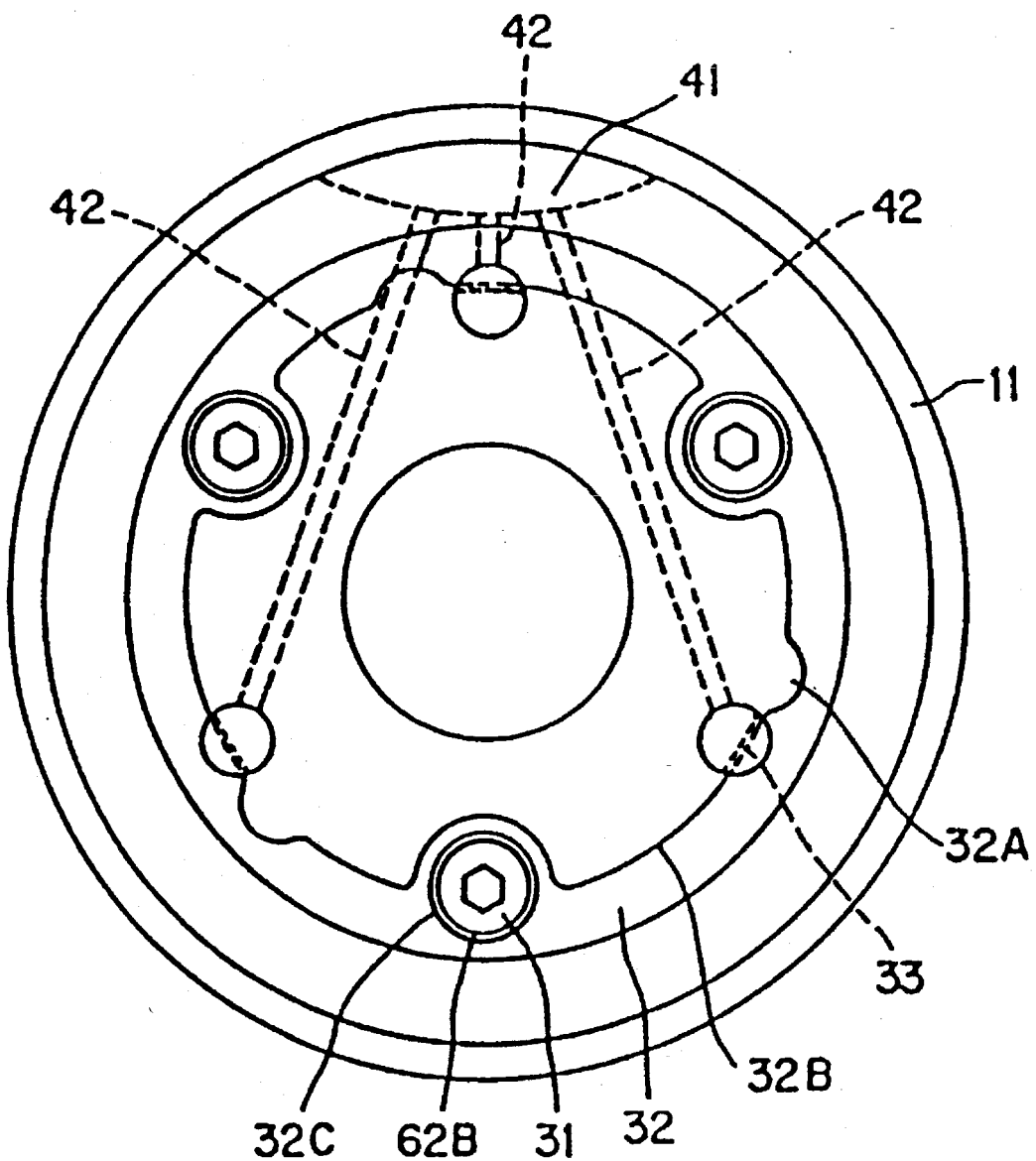

Further, to fix the pinion shaft 6A and the planetary carriers 6 (61,62) together, there is also provided a stopper ring 32 of a predetermined thickness in contact with the outer wall of the planetary carrier 62. This stopper ring 32 has a planar configuration as illustrated in FIG. 3.

Fitting slits 33 are formed at desired positions in a free end portion of the pinion shaft 6A. With the free end portion of the pinion shaft 6A extending outwardly from the planetary carrier 61 through the pinion shaft mounting holes 61A,62A, the stopper ring 32 is fitted at predetermined parts thereof on the free end portion.

The stopper ring 32 is provided with pinion shaft advance permitting portions 32A and pinion shaft lock portions 32B. The pinion shaft advance permitting portions 32A permit axial movement of the pinion shaft 6A, while the pinion shaft lock portions 32B lock axial movement of the pinion shaft 32 by fitting engagement with the fitting slits 33. The pinion shaft advance permitting portions 32A of the stopper ring 32 are formed as indentations formed by cutting off an inner periphery of the stopper ring 32, so that the inner periphery other than the pinion shaft advance permitting portions 32A does not permit insertion of the pinion shaft 6A.

The fitting slits 33 in the pinion shaft 6A, on the other hand, are open radially and outwardly in the free end portion of the pinion shaft 6A and are formed to a depth about one third of the diameter of the pinion shaft 6A.

Regarding the pinion shaft lock portions 32B in the stopper ring 32, the diameter of the inner periphery of the stopper ring 32 is set a little greater than the bottom of the fitting slit 33 in the pinion shaft 6A so that an inner peripheral portion of the stopper ring 32 is fitted in the fitting slit 33 to axially lock the pinion shaft 6A.

Further, bolt inserting holes 32C are formed as bolt attachment portions which permit attachment of the bolts 31 to the planetary carrier 6A while maintaining the fitted state of the stopper ring 32 and the fitting slit 33.

When the stopper ring 32 is gradually rotated in a state ready for fitting in the fitting slits 33, it becomes possible to see, through the bolt inserting holes 32C, bolt inserting holes 62B formed in the planetary carrier 6 (61,62). In this state, the bolts 31 are attached.

Owing to the construction described above, the fixing work of the pinion shaft 6A is conducted as will be described next.

Through the pinion shaft mounting holes 61A,62A, the pinion shaft 6A is first inserted and fitted from the side of the axial end of the output axle 2 or 3. At this time, the stopper ring 32 is brought into contact with the outer wall of the planetary carrier 62 and the pinion shaft advance permitting portions 32A are brought into registration with the pinion shaft mounting holes 61A,62A.

The pinion shaft 6A is inserted through the pinion shaft mounting holes 61A,62A and the pinion shaft advance permitting portions 32A so that the free end thereof extends outwardly from the outer wall of the planetary carrier 62. In this state, the pinion shaft 6A is rotated and adjusted so that the fitting slits 33 of the pinion shaft 6A are directed outwardly in the radial direction.

Thereafter, the stopper ring 32 is rotated to adjust its position so that the bolt inserting holes 62B of the planetary carrier 62 can be seen through the bolt inserting holes 32C.

As a result, the pinion shaft lock portions 32B formed of the inner peripheral portion of the stopper ring 32 are automatically fitted in the fitting slits 33 of the pinion shaft 6A, whereby axial movement of the pinion shaft 6A is locked.

The bolts 31 are then tightened through the bolt inserting holes 62B, so that the planetary carrier 6 (61,62) is tightened and fixed to complete the fixing of the pinion shaft 6A.

Each bolt 31 is formed so that, during its attachment, an upper end of its head portion projects from the out wall of the stopper ring 32. Even if the stopper ring 32 begins to rotate, the head portion of the bolt 31 stops the peripheral edge of the corresponding bolt inserting hole 32C of the stopper ring 32 so that the stopper ring is prevented from rotation.

As has been described above, the alignment upon connection of the two-piece planetary carriers 6 (61,62) and that for the mounting of the pinion shaft 6A are achieved readily at the same time. Without conducting fixing work for each pinion shaft 6A, the work can be completed in fewer steps needed for the attachment of the stopper ring 32.

A lubrication system for each pinion shaft 6A and the first and second planetary gears 5A,5B is constructed as will be described next.

As is illustrated in FIG. 3, an oil catch 41 is formed in the planetary carrier 62 at a portion thereof which becomes a top portion when the apparatus is mounted on a vehicle. Also formed are oil feeding holes 42 which communicate from the oil catch 41 to the corresponding pinion shaft mounting hole 62A.

In the pinion shaft 6A, a pinion-shaft-side oil feed hole 6B is formed extending axially through an axial central portion thereof and oil guide channels 6C are also provided extending from the pinion-shaft-side oil feed hole 6B to the outer periphery of the pinion shaft 6A.

The pinion-shaft-side oil feed hole 6B is communicated to the outer periphery of the pinion shaft 6A at an end portion thereof. This communication opening is in registration with an opening of the oil feeding hole 42 in the inner periphery of the mounting hole 62A in the planetary carrier 62, so that the pinion-shaft-side oil feed hole 6B and the oil feeding hole 42 are communicated with each other via the end portion of the pinion shaft 6A and the pinion shaft mounting hole 62A.

Because of the construction described above, operation of the apparatus causes the first planetary gear 5A and the second planetary gear 5B to rotate about the corresponding output axles 2 or 3, whereby the lubricating oil inside the casing 11 is scraped up.

The lubricating oil so scraped up then drops into the oil catch 41 in the top of the planetary carrier 62 and is retained there. The lubricating oil retained in the oil catch 41 as described above is fed under the action of gravity to the mounting hole 62A of the corresponding pinion shaft 6A through the oil feeding holes 42.

The lubricant oil so fed flows into the pinion-shaft-side oil feed hole 6B in the axially central portion of the pinion shaft 6A and is then guided through the oil guide channels 6C to rotatably supported portions of the planetary gears 5A,5B on the outer periphery of the pinion shaft 6A.

As a result, efficient lubrication is performed without providing any new pressurizing system and, by using the feature that the planetary carriers 6 (61,62) are mounted in the fixed manner, gravity feeding of lubricating oil has been achieved.

The first planetary gear 5A and the second planetary gear 5B in the shift mechanism A are formed with the same number of teeth as the single-piece pinion 5 as described above. However, these first and second planetary gears 5A,5B are generally formed with different numbers of teeth as already described above with reference to FIG. 11.

When they are formed with such different numbers of teeth, however, a play is needed between the first planetary gear 5A and the second planetary gear 5B to permit gear cutting.

The shift mechanism A therefore becomes greater in the direction of its width, thereby making it impossible to satisfy the condition for the apparatus that it must be installed in a limited small space. The apparatus cannot therefore be mounted on an actual vehicle.

In the present embodiment, therefore, the first planetary gear 5A and the second planetary gear 5B are integrally formed with the same number of teeth, and the first sun gear 4A and the second sun gear 4B rotatable in mesh with the first planetary gear 5A and the second planetary gear 5B are provided with teeth in different numbers by using profile shifted gears.

No play is therefore required between the first planetary gear 5A and the second planetary gear 5B upon producing them, thereby permitting a reduction in width. By making the shift mechanism A smaller in the widthwise direction, the shift mechanism can be mounted on an actual vehicle.

Figure 2:
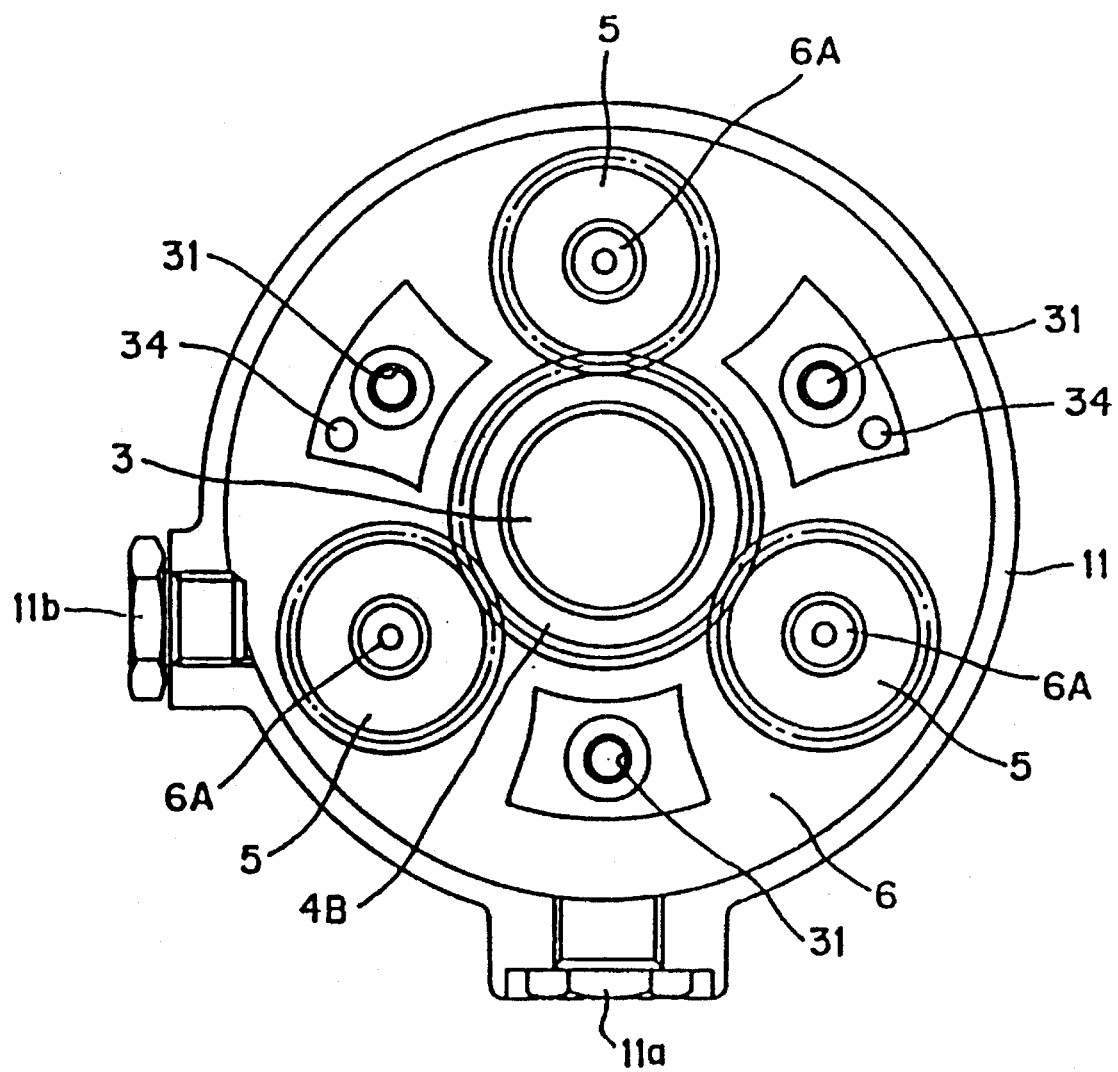
Figure 4:
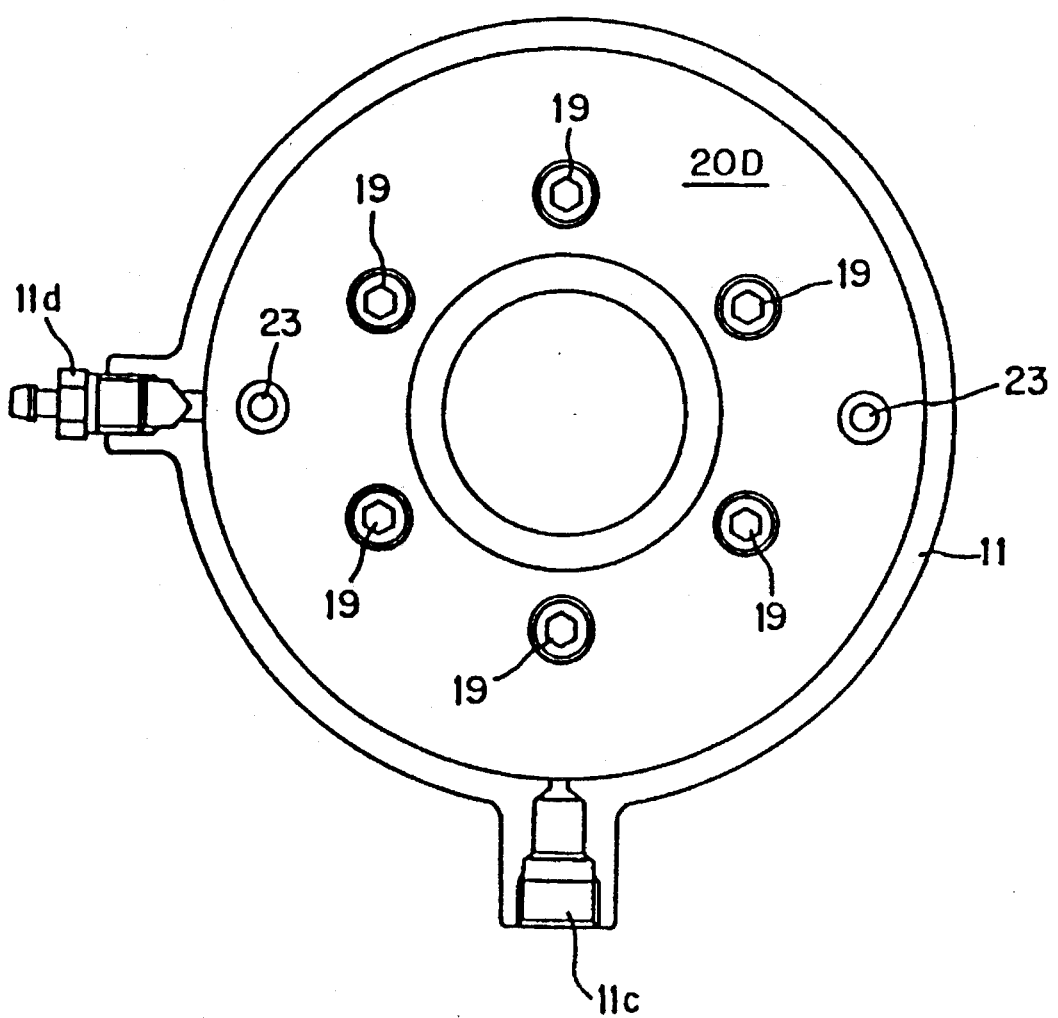

In FIGS. 2 and 4, there are shown a level plug 11a, a magnet plug 11b, an air breeder 11c and a hydraulic pressure feeding port 11d.

As the hydraulic circuit construction according to the one embodiment of this invention for the vehicular left/right drive force adjusting apparatus is constructed as described above, operation of the hydraulic circuit construction can be described along with overall operation of the vehicular left/right drive force adjusting apparatus as will be described next.

First, when it is desired to transmit drive torque of the input shaft 1 in a greater proportion to the first output axle 2, hydraulic pressure prescribed in accordance with the proportion is fed to the multi-plate clutch mechanism B on the side of the second output axle 3.

As a result, the multi-plate clutch mechanism B on the side of the second output axle 3 is brought into a desired state of engagement so that torque is transmitted from the clutch plates 8A increased in speed by the shift mechanism A to the clutch plates 8B rotating at a normal speed and a desired amount of drive torque inputted to the second output axle 3 is hence returned to the input shaft 1. As a consequence, torque is transferred to the first output axle 2.

The drive torque to be transmitted to the first output axle 2 therefore becomes greater by the desired amount than the drive torque to be transmitted to the second output axle 3, whereby the desired torque distribution can be achieved.

When it is desired to make torque, which is to be distributed to the second output axle 3, greater than drive torque to be transmitted to the first output axle 2, on the other hand, prescribed hydraulic pressure is fed to the multi-plate clutch mechanism B on the side of the first output axle 2 in contrast to the operation described above.

As a consequence, the distribution can be achieved likewise with more torque distributed to the second output axle 3.

Further, the distribution ratio is adjusted by the level of fluid pressure to be fed to the multi-plate clutch mechanism B. This is effected by adjusting the amount of torque to be returned, that is, by controlling the displacement of the piston 20 so that the degree of engagement of the multi-plate clutch mechanism B is adjusted.

According to the mechanism as described above, torque distribution is adjusted by transferring a desired amount of torque of one of the axles to the other axle instead of adjusting the torque distribution by using energy loss such as a brake. It is therefore possible to distribute torque at a desired ratio without causing any substantial torque loss or energy loss.

Upon driving the piston 20, the working oil is fed by the change-over valve 76 (or 110) to only one of the two hydraulic pressure lines connected to the left and right, pressurizing operation compartments 20D,20D, thereby eliminating the potential problem that fluid pressure may be fed simultaneously to the left and right, multi-plate clutch mechanisms B.

The working oil pressurized by the electric pump 70 is guided to the proportional valve 74 via the check valve 71, the pressure switch 72 and the accumulator 73. The working oil is regulated to desired hydraulic pressure at the proportional valve 74 through the controller 81, and the working oil so regulated is delivered to the change-over valve 76 (110). The working oil then flows from the change-over valve 76 (110) and then through one of the two hydraulic pressure lines connected to the left and right, pressurizing operation compartments 20D,20D, whereby the piston 20 is displaced.

If the proportional valve 74 fails, this failure can be detected by the hydraulic sensor 75. The feeding of the working oil to the hydraulic circuit is then stopped, for example, by regulating an output of the electric pump 70. This makes it possible to avoid unnecessary locking of the multi-plate clutch mechanism B.

Similarly, if the change-over valve 76 (110) fails, the failure can be detected by the pressure switch 78R or the pressure switch 78L. The feeding of the working oil to the oil line from the change-over valve 76 (110) to the multi-plate clutch mechanism B is then stopped, for example, by regulating an output from the proportional valve 74 through the controller 81. It is therefore possible to avoid such an inconvenience that, upon failure of the change-over valve 76 (110), only one of the left and right, multi-plate clutch mechanism B is locked although such locking is not desired.

If the 3-mode change-over valve 110 fails, especially, feeding of drive electric power to the change-over valve 110 is cut off so that the change-over valve 110 takes the hydraulic pressure cut-off mode in which hydraulic pressure is not fed to any one of the left and right, multi-plate clutch mechanisms B. It is therefore possible to avoid such an inconvenience that one of the left and right, multi-plate clutch mechanism B is locked.

If the electric pump 70 fails (including an insufficient output), undesired torque distribution can be avoided by a measure, for example, by controlling the proportional valve 74 accordingly or by stopping the electric pump 70. If the electric pump 70 fails (is operated excessively), this failure can be detected through the pressure switch 72. By controlling the proportional valve 74 through the controller 81, surplus working oil is returned to the oil reservoir 77. Since the working oil fed by the electric pump 70 is not fed to the change-over valve 76, it is possible to avoid unnecessary locking of the multi-plate clutch mechanism B or a malfunction of the change-over valve 76.

By adopting the construction that a part of the hydraulic circuit is submerged in the oil tank 82, valve bodies of the A/T type which involves some oil leakage can be applied to the hydraulic circuit. This makes it possible to reduce the size and weight of the hydraulic system while assuring a high level of accuracy in the adjustment of hydraulic pressure.

Operation of the clutch B1 in the multi-plate clutch mechanism B is effected by driving the piston B2 arranged outside the differential case 13 and pressing the clutch B1 disposed in the differential case 13. As a result of the arrangement of the clutch B1 in the differential case 13 as mentioned above, the vehicular left/right drive force adjusting apparatus can be made smaller in the widthwise direction.

Further, the arrangement of the piston B2 outside the differential case 13 makes it possible to set the outer diameter of the piston 20 without being limited by the outer diameter of the differential case 13, so that the piston 20 can be provided with a large effective pressing area.

Engagement force required for the clutch B1 can therefore be obtained by a small stroke of the piston 20, so that a widthwise size reduction of the vehicular left/right drive force adjusting apparatus can be achieved.

To press the clutch B1, the clutch hub 8C is pulled by the piston 20 via the sheath axle 7 so that the clutch plates 8A and the clutch plates 8B are pressed against each other. At this time, the pressing of the clutch plates is effected because the clutch plates 8B are supported by the end portion 13A or 13B of the differential case 13. Accordingly, engagement of the multi-plate clutch mechanism B is performed while using the differential case 13 as a support member.

The multi-plate clutch mechanism B generally requires a reaction force member (support member) for supporting pressing force. The differential case 13 however can serve as a support member because the sheath axle 7 is designed to serve as a pulling member upon engagement of the multi-plate clutch mechanism B.

Since the differential case 13 can be used as a support member, it is unnecessary to additionally provide a support member so that the vehicular left/right drive force adjusting apparatus can be designed smaller in the widthwise direction.

To have the above-described multi-plate clutch mechanism B engaged, the piston 20 is driven. The piston 20 is provided with the limit mechanism C. Upon stroke, the pin 23 is guided by the guide hole 20E and rotation of the piston 20 is limited.

Because the piston 20 is mounted on the sheath axle 7 with the bearing 21 interposed therebetween, rotational force is applied to the piston 20 for the development of friction at the bearing 21 upon rotational drive of the sheath axle 7. If the pin 23 and the guide 20E were not provided for limiting rotation, the piston 20 would rotate so that the sealing structure 22 and the like of the piston 20 would tend to wear out in a short time. It would therefore be difficult to practice the mechanism of the present embodiment. Rotation of the piston 20 is however limited by the limit mechanism C, so that the performance of the sealing mechanism 22 can be ensured stably over a long period of time.

Further, the clutch B1 and the piston B2 in the multi-plate clutch mechanism B are connected via the sheath axle 7. This has made it possible to arrange the clutch B1 inside the differential case 13 and the piston B2 outside the differential case 13.

The installation of the clutch B1 is conducted by mounting the clutch B1, which is in a state assembled beforehand in the differential case 13, on the differential carrier 12. Similarly, the installation of the piston B2 is effected by assembling the piston B2 in the casing 11 of the shift mechanism A in advance.

It is therefore necessary to design the sheath axle 7, which connects the clutch B1 and the piston B2 together, in a form splittable into two parts, one being on the side of the differential case 13 and the other on the side of the shift mechanism A. In the present embodiment, the sheath axle 7 is divided in the piston-side member 7A and the clutch-side member 7B, which are connected together by the connecting mechanism D.

As a consequence, the piston B2 can be installed on the side of the shift mechanism A while arranging the clutch B1 in the differential case 13. This has made it possible to assemble the mechanism of the present embodiment.

Further, as already explained above upon description of the construction of the connecting mechanism D, the connection of the piston-side member 7A and the clutch-side member 7B of the sheath axle 7 by the connecting mechanism D can be achieved easily. Transmission of rotational force from the shift mechanism A as well as transmission of drive force along the axis of the piston B2 in the multi-plate clutch mechanism B can be performed without failure owing to the characteristics of the connecting mechanism D.

The planetary carrier 6 (61,62) in the shift mechanism A has to be designed splittable into two pieces because axial drive force is applied to the second sun gear 4B. In the present embodiment, the planetary carrier 61 and the planetary carrier 62 can be readily put together by the stopper ring 32 in accordance with the procedures described above, thereby permitting efficient assembly of the shift mechanism A.

Lubrication between the first planetary gear 5A and second planetary gear 5B and the pinion shaft 6A in the shift mechanism A is effected without problem from the oil catch 41 and through the oil feeding hole 42, the pinion-shaft-side oil feed hole 6B and the oil guide channel 6C as described above.

Installation of a new pressurizing mechanism is no longer needed owing to the provision of the above lubricating system, thereby achieving a further size reduction for the mechanism of the present embodiment.

The sealing mechanism 22 on the piston B2 operates as will be described next.

Since the lubricating operation compartment sealings 22A,22D and the pressurizing operation compartment sealings 22B,22C are arranged at an interval therebetween to avoid any mutual interference within the ranges of their sliding motion, the interiors of the differential carrier 12 and the casing 11 as the lubricating operation compartment 24, which contains a prescribed amount of lubricating oil, and the pressurizing compartment 20D divided by the piston 20 and fed with pressurized working oil are maintained liquid tight without failure.

Sliding motion of the piston 20 forms an oil film on the inner wall and scrapes off the oil film, so that the lubricating oil and the pressurized working oil may be mixed together. Owing to the distance between the sealings, the pressurizing compartment sealings 22B,22C do not scrape off an oil film from the inner wall of the lubricating operation compartment 24 and do not mix the lubricating oil with the working oil. Further, the lubricating operation compartment sealings 22A,22D do not scrape the pressurized working oil in the pressurizing compartment 20D and do not mix it with the lubricating oil. Operation of each operation compartment is therefore performed well.

With a view to forming a relatively thick oil film, oil of relatively high viscosity (hypoid gear oil or the like) is stored as lubricating oil inside the lubricating operation compartment 24. For the pressurizing compartment 20D, on the other hand, ATF (automatic transmission fluid) or power steering oil of relatively low viscosity or the like oil is used to provide the piston 20 with good operation responsibility. If mixing of these oils takes place, there is the potential problem that seizure may occur in the lubricating operation compartment 24 or the operation responsibility of the piston 20 in the pressurizing compartment 20D may be impaired. These potential problems have however been eliminated by the above-described operation, so that the mechanism of the present embodiment can be stably operated over a long period of time.

In the sealing mechanism 22, the grooves 25 are formed in the inner wall of the lubricating operation compartment 24 over the entire periphery at the locations corresponding to the positions between the lubricating operation compartment sealings 22A,22D and the pressurizing compartment sealings 22B,22C, respectively, and the breeding passages 26 are provided extending to the respective grooves 25 formed in the lower part of the inner wall of the lubricating operation compartment 24. Any lubricating oil or pressured working oil leaked out from the lubricating operation compartment 24 or the pressurizing compartment 20D is therefore retained in the corresponding groove 25 formed in the inner wall over the entire periphery thereof and prevented from penetrating into the lubricating operation compartment 24 or the pressurizing compartment 20D. Operation of each operation compartment can therefore be performed well.

If the sealing mechanism 22 is broken, the oil on the broken side leaks out through the corresponding breeding passage 26 so that the breakage can be promptly discovered.

In the hydraulic circuit construction (see FIG. 1) of the above embodiment and the hydraulic circuit constructions (see FIGS. 12 to 14) as their modifications, the structures of the 2-mode change-over valve 76 and 3-mode change-over valve 110 are not limited to the illustrated structures. Regarding the 2-mode change-over valve 76, any change-over valve can be used as long as it can take either one of a communicating mode in which desired hydraulic pressure is fed from the proportional valve (hydraulic pressure regulating means) 74 to one of the left and right pressurizing compartments (hydraulic pressure input means) 20D and another communicating mode in which the desired hydraulic pressure is fed to the other pressurizing compartment (hydraulic pressure input means) 20D. Turning next to the 3-mode change-over valve 110, any 3-mode change-over valve can be used insofar as it can take any one of three modes, that is, a communicating mode in which desired hydraulic pressure is fed from the proportional valve (hydraulic pressure regulating means) 74 to one of the left and right pressurizing compartments (hydraulic pressure input means) 20D, another communicating mode in which the desired hydraulic pressure is fed to the other pressurizing compartment (hydraulic pressure input means) 20D, and a closing mode in which no hydraulic pressure is fed to any one of the pressurizing compartments (hydraulic pressure input means) 20D.

Further, the change-over valve useful in the present invention is not limited to such 2-mode change-over valve 76 and 3-mode change-over valve 110. Any change-over valve can be used as long as it has at least the construction that hydraulic pressure can be fed to either one of the left and right pressurizing compartment (hydraulic pressure input means) 20D and no hydraulic pressure is fed to both the pressurizing compartments 20D at the same time.

To permit more appropriate operation of the hydraulic circuit, it is desired, as described above, to control the change-over valve 76 or 110 and the proportional valve 74 on the basis of the levels of hydraulic pressure detected by the pressure switches 72 and 78R or 78L as hydraulic pressure detection means. It can however be contemplated to simplify the hydraulic circuit and hence to reduce the manufacturing cost by omitting one of the pressure switches 72 and 78R or 78L or both.

It is still possible to avoid feeding of undesired working oil by simply controlling the change-over valve 76 or 110 and the proportional valve 74 on the basis of the levels of hydraulic pressure detected by the hydraulic switches 72 and 78R or 78L without limiting the change-over valve 76 or 110 to the structure described above, that is, to the structure that can structurally prevent simultaneous feeding of hydraulic pressure to both the pressurizing compartments 20D.

In this case, it can be contemplated to provide only one of the pressure switches 72 and 78R or 78L. When it is designed especially to control the change-over valve 76 or 110 and the proportional valve 74 on the basis of the levels of hydraulic pressure detected by the pressure switch 78R or 78L, simultaneous engagement or coupling of both the left and right hydraulic torque transmission mechanisms, said engagement or coupling being a potential cause for interlocking of the wheels, for example, can be avoided by the control.

Figure 15:
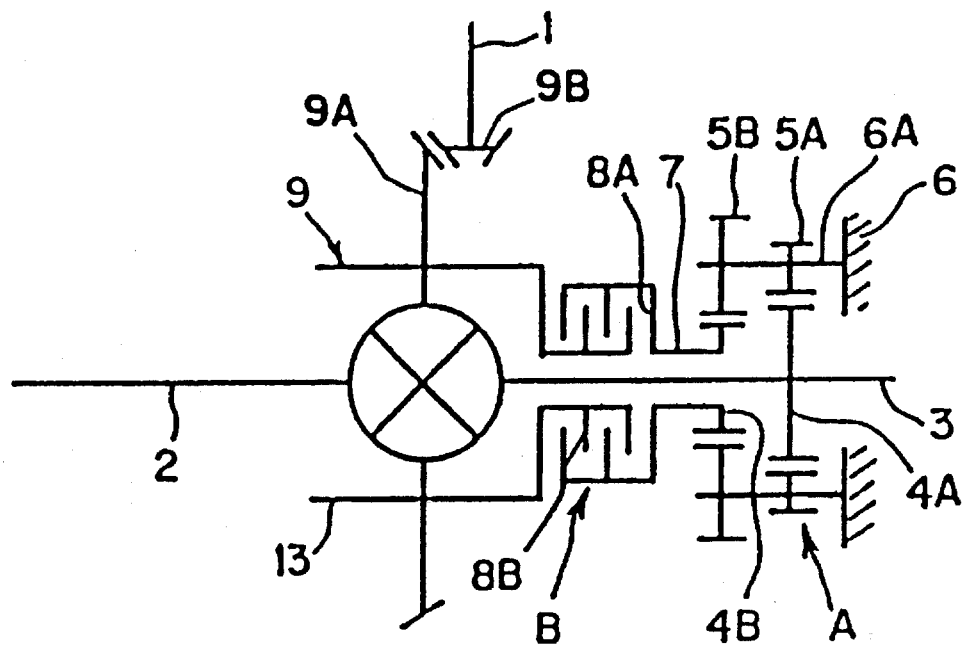
FIG. 15 is a schematic diagram for illustrating the principle of the vehicular left/right drive force adjusting apparatus according to the invention.

Incidentally, the various hydraulic circuit constructions described above can be applied not only to vehicular left/right drive force adjusting apparatuses of such a structure as shown in FIGS. 11 and 15 but also to such various vehicular left/right drive force adjusting apparatuses as will be described next with reference to FIGS. 16 to 23.

Here, these various vehicular left/right drive force adjusting apparatuses will be described.

Figure 16:
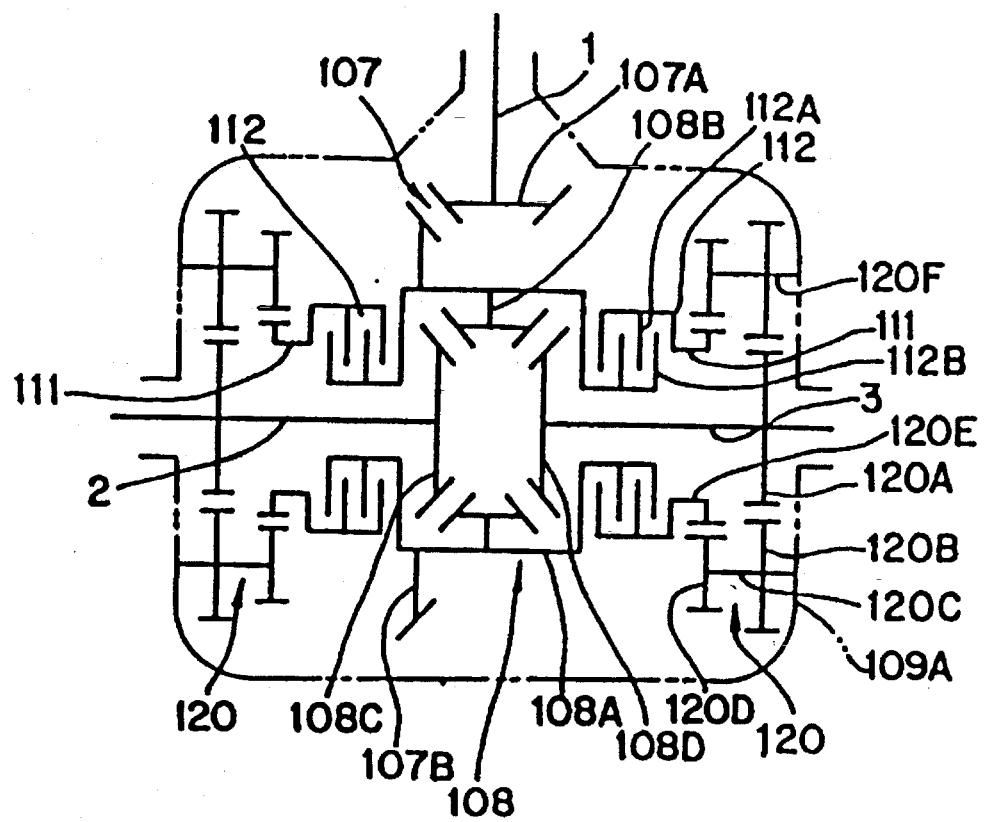
FIG. 16 is a schematic illustration of a modified left/right drive force adjusting apparatus which is an alternative to FIG. 15.

The vehicular left/right drive force adjusting apparatus shown in FIG. 16, for example, is different from the above-described embodiment in the construction of a shift mechanism 120 of a drive force transmitting control mechanism 109A. Since a first sun gear 120A is formed smaller in diameter than a second sun gear 120E, the second sun gear 120E rotates slower than the first sun gear 120A. The shift mechanism 120 therefore serves as a speed-decreasing mechanism.

During normal running, clutch plates 112A rotate at a lower rotational speed than clutch plates 112B so that, when a multi-plate clutch mechanism 112 on the side of the right wheel is engaged, torque in an amount corresponding to the state of the engagement is fed from the side of the input shaft 1 to the side of the right-wheel axle 3.

A shift mechanism 120 and, as a torque transmission mechanism of the variable transmitted power amount type, a multi-plate clutch mechanism 112, both mounted on the left-wheel axle 2, are constructed similarly. When it is desired to distribute drive torque from the input shaft 1 in a greater proportion to the left-wheel axle 2, the multi-plate clutch mechanism 112 on the side of the left-wheel axle 1 is caused to engage adequately in accordance with the amount to be distributed (distribution ratio). When it is desired to distribute more torque to the right-wheel axle 3, the multi-plate clutch mechanism 112 on the side of the right-wheel axle 3 is caused to engage properly in accordance with the distribution ratio.

Like the apparatus of the embodiment illustrated in FIG. 15, each multi-plate clutch mechanism 112 is of the hydraulically driven type. The state of engagement of the multi-plate clutch mechanism 112 can therefore be controlled by adjusting the level of hydraulic pressure, whereby the amount of drive force to be fed from the input shaft 1 to the left-wheel axle 2 or the right-wheel axle 3 (in other words, the left-to-right distribution ratio of drive force) can be adjusted with an adequate level of accuracy.

As in the apparatus of the embodiment, this modification is also designed so that the left and right multi-plate clutch mechanisms 112 are not brought into full engagement at the same time. Namely, it is designed that, when one of the left and right multi-plate clutch mechanisms 112 is fully engaged, the other multi-plate clutch mechanism 112 is allowed to develop at least some slip.

To drive the multi-plate clutch mechanisms 112, a hydraulic circuit of the above-described construction (see FIGS. 1, 12, 13 and 14) is arranged.

Incidentally, numeral 111 corresponds to numeral 7 in the embodiment and designates a hollow axle (sheath axle).

Figure 17:
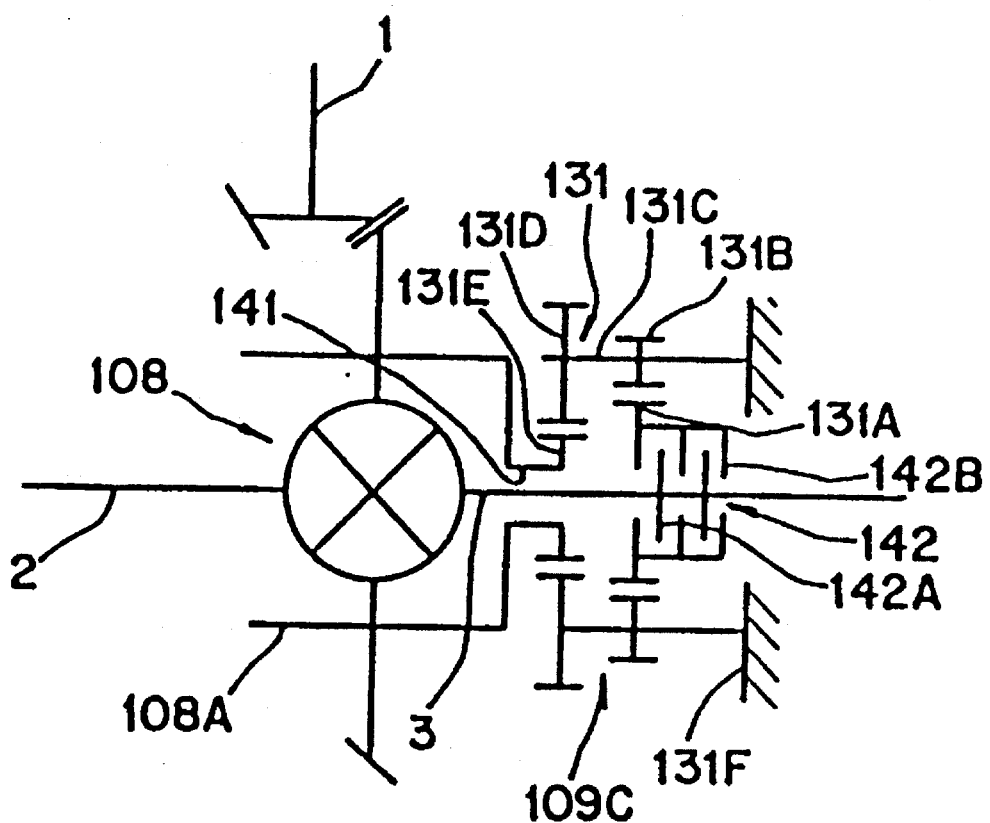
FIG. 17 is a schematic illustration of a further alternative left/right drive force adjusting apparatus.

The vehicular left/right drive force adjusting apparatus shown in FIG. 17 is different from the above-described embodiment in the construction of a shift mechanism 131 and a multi-plate clutch mechanism 142 in each drive force transmission control mechanism 109C. Here again, a description will be made of the right-hand mechanism.

Designated at numeral 108 is a differential mechanism (rear differential).

The shift mechanisms 131 are arranged on left and right side walls of the differential case 108A on the side of the input shaft 1. Each shift mechanism is constructed of two sets of planetary gear mechanisms connected in series, that is, a first sun gear 131A, a second sun gear 131E, a first planetary gear 131B, a second planetary gear 131D, a pinion shaft 131C, and a planetary carrier 131F. A plate portion of the first sun gear 131A serves as a drive force transmitting auxiliary member 141.

Interposed between the drive force transmitting auxiliary member 141 and the right-wheel axle 3 is the multi-plate clutch mechanism 142 as a torque transmission mechanism of the variable transmitted power amount type. The multi-plate clutch mechanism 142 is formed of clutch plates 142B on the side of the axle 3 and clutch plates 142B on the side of the drive force transmitting auxiliary member 141, said former clutch plates and said latter clutch plates being alternately juxtaposed. The state of their engagement is adjusted depending on hydraulic pressure fed from an unillustrated hydraulic pressure system.

When the multi-plate clutch mechanism 142 is caused to engage, a transmission path of drive force is established extending from the side of the axle 3 to a differential case 108A on the side of the input shaft 1 via the multi-plate clutch mechanism 142, the first sun gear 131A, the first planetary gear 131B, the second planetary gear 131D and the second sun gear 131E.

Since the first sun gear 131A is formed greater in diameter than the second sun gear 131E in this modification, the second sun gear 131E rotates at a higher speed than the first sun gear 131A. The shift mechanism 131 therefore serves as a speed-decreasing mechanism, so that the drive force transmitting auxiliary member 141 is made slower than the side of the input shaft 1.

The clutch plates 142A therefore rotate at a higher speed than the clutch plates 142B. When the multi-plate clutch mechanism 142 is caused to engage, torque in an amount corresponding to the state of the engagement is therefore fed (returned) from the side of the right-wheel axle 3 to the side of the input shaft 1.

The shift mechanism 131 and the multi-plate clutch mechanism 142, which are both arranged on the left-wheel axle 2, are also constructed similarly. When it is desired to distribute drive torque from the input shaft 1 in a greater proportion to the left-wheel axle 2, the multi-plate clutch mechanism 142 on the side of the right-wheel axle 3 is caused to engage adequately in accordance with the amount to be distributed (distribution ratio). When it is desired to distribute more torque to the right-wheel axle 3, the multi-plate clutch mechanism 142 on the side of the left-wheel axle 3 is caused to engage properly in accordance with the distribution ratio.

Since each multi-plate clutch mechanism 142 is of the hydraulically driven type, the state of engagement of the multi-plate clutch mechanism 142 can be controlled by adjusting the level of hydraulic pressure so that the amount of drive force to be fed from the input shaft 1 to the left-wheel axle 2 or the right-wheel axle 2 (in other words, the left-to-right distribution ratio of drive force) can be adjusted with an adequate level of accuracy.

This modification is also designed so that the left and right multi-plate clutch mechanisms 142 are not brought into full engagement at the same time. Namely, it is designed that, when one of the left and right multi-plate clutch mechanisms 142 is fully engaged, the other multi-plate clutch mechanism 142 is allowed to develop at least some slip.

To drive the multi-plate clutch mechanisms 142, a hydraulic circuit of the above-described construction (see FIGS. 1, 12, 13 and 14) is arranged.

Figure 18:
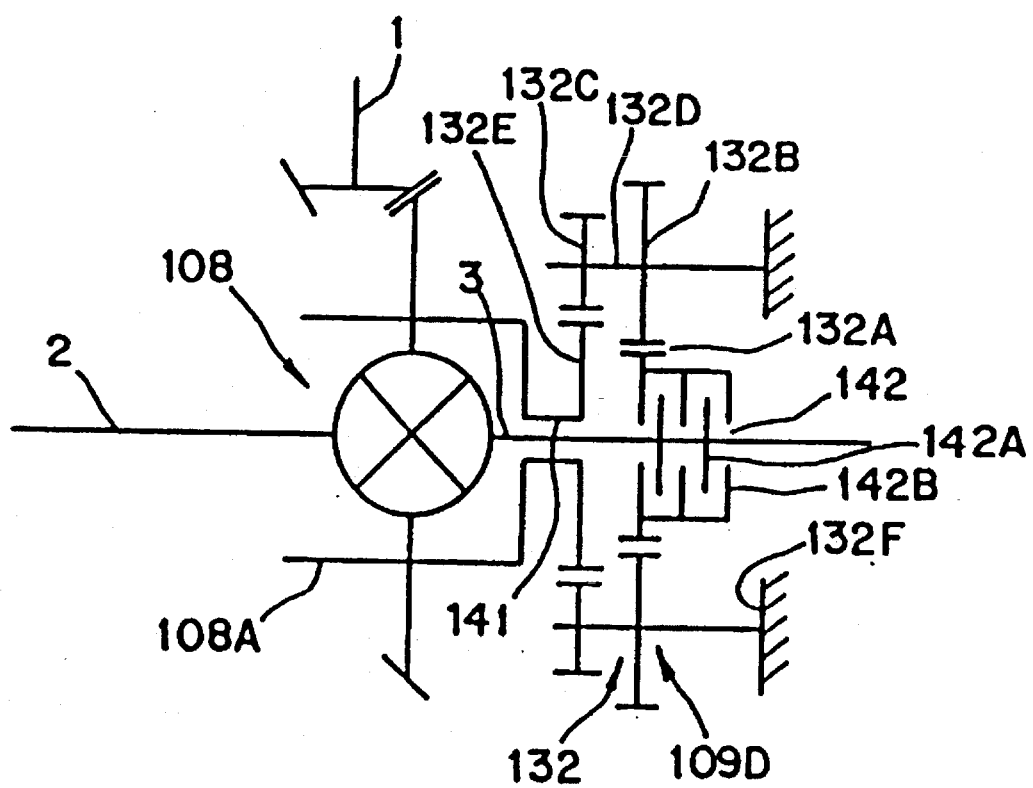
FIG. 18 is a schematic illustration of a modified form of the apparatus of FIG. 17.

The vehicular left/right drive force adjusting apparatus shown in FIG. 18, like the apparatus described above (see FIG. 17), includes a shift mechanism 132 and a multi-plate clutch mechanism 142 in each drive force transmission control mechanism 109D. In this modification, a first sun gear 132A is formed smaller in diameter than a second sun gear 132E. The second sun gear 132E therefore rotates at a lower speed than the first sun gear 132A, whereby the shift mechanism 132 serves as a speed-increasing mechanism so that the drive force transmitting auxiliary member 141 is increased in speed than the side of the input shaft 1.

The clutch plates 142A therefore rotate at a lower speed than the clutch plates 142B. When the multi-plate clutch mechanism 142 is caused to engage, torque in an amount corresponding to the state of the engagement is therefore fed from the side of the input shaft 1 to the side of the right-wheel axle 3.

on the other hand, the shift mechanism 132 and the multi-plate clutch mechanism 142, both arranged on the left-wheel axle 2, are also constructed similarly. When it is desired to distribute drive torque from the input shaft 1 in a greater proportion to the left-wheel axle 2, the multi-plate clutch mechanism 142 on the side of the left-wheel axle 2 is caused to engage adequately in accordance with the amount to be distributed (distribution ratio). When it is desired to distribute more torque to the right-wheel axle 3, the multi-plate clutch mechanism 142 on the side of the right-wheel axle 3 is caused to engage properly in accordance with the distribution ratio.

Since each multi-plate clutch mechanism 142 is of the hydraulically driven type, the state of engagement of the multi-plate clutch mechanism 142 can be controlled by adjusting the level of hydraulic pressure so that the amount of drive force to be fed from the input shaft 1 to the left-wheel axle 2 or the right-wheel axle 3 (in other words, the left-to-right distribution ratio of drive force) can be adjusted with an adequate level of accuracy.

This modification is also designed so that the left and right multi-plate clutch mechanisms 142 are not brought into full engagement at the same time. Namely, it is designed that, when one of the left and right multi-plate clutch mechanisms 142 is fully engaged, the other multi-plate clutch mechanism 142 is allowed to develop at least some slip.

To drive the multi-plate clutch mechanisms 142, a hydraulic circuit of the above-described construction (see FIGS. 12, 13 and 14) is arranged.

Figure 19:
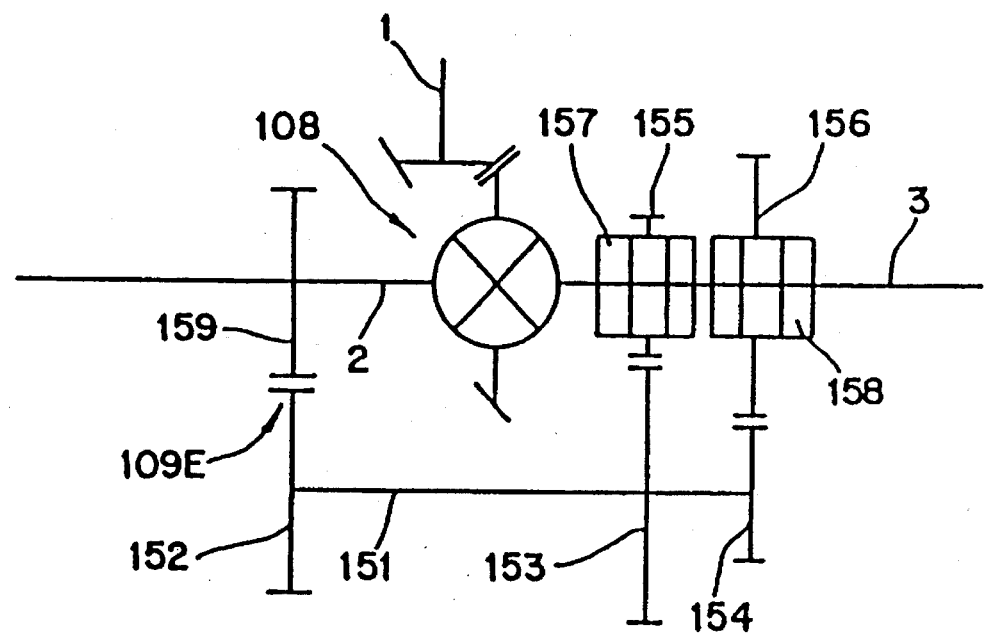
FIG. 19 is a schematic illustration of a further alternative form of left/right drive force adjusting apparatus.

In the vehicular left/right drive force adjusting apparatus illustrated in FIG. 19, each drive force transmission control mechanism 109E is provided with a shaft (countershaft) 151 in parallel with the axles 2,3. A middle-diameter gear 152, a large-diameter gear 153 and a small-diameter gear 154 are mounted on the shaft 151. One of the axles, that is, the axle 2 is provided with a middle-diameter gear 159 which is rotatable in mesh with the middle-diameter gear 152, while the other axle 3 is provided with a small-diameter gear 155 meshed with the large-diameter gear 153 and also with a large-diameter gear 156 meshed with the small-diameter gear 154. The combination of these gears 159,152,153,155 constructs a speed-increasing mechanism as a shift mechanism, while the combination of the gears 159,152,154,156 makes up a speed-reducing mechanism as another shift mechanism.

Between the axle 3 and the small-diameter gear 155 and between the axle 3 and the large-diameter gear 156, hydraulic multi-plate clutches 157,158 are interposed, respectively, as torque transmission mechanisms of the variable transmitted power amount type. Incidentally, the multi-plate clutches 157,158 can also be mounted on the shaft 151.

As a consequence, the shaft 151 rotates at the same speed as the axle 2 but the small-diameter gear 155 on the axle 3 rotates at a higher speed than these shaft 151 and axle 2. During normal running in which no substantial differential motion takes place between the left wheel and the right wheel, the small-diameter gear 155 rotates at a higher speed than the axle 3. On the other hand, the large-diameter gear 156 on the axle 3 rotates at a lower speed than these shaft 151 and axle 2 but, during normal running in which no substantial differential motion takes place between the left wheel and the right wheel, rotates at a higher speed than the axle 3.

When the multi-plate clutch 157 is caused to engage, torque is transmitted from the side of the small-diameter gear 155, whose speed is higher than that of the axle 3, to the side of the axle 3 so that torque to be distributed to the side of the axle 2 decreases correspondingly.

When the multi-plate clutch 158 is caused to engage, on the other hand, torque is returned from the side of the axle 3 to the side of the large-diameter gear 156 whose speed is lower than the axle 3 so that torque to be distributed to the side of the axle 2 increases correspondingly.

Since the multi-plate clutch mechanism 157,158 are of the hydraulically driven type, the state of engagement of the multi-plate clutch mechanism 157,158 can be controlled by adjusting the level of hydraulic pressure so that the amount of drive force to be fed from the input shaft 1 to the left-wheel axle 2 or the right-wheel axle 3 (in other words, the left-to-right distribution ratio of drive force) can be adjusted with an adequate level of accuracy.

This modification is also designed so that the two multi-plate clutch mechanisms 157,158 are not brought into full engagement at the same time. Namely, it is designed that, when one of the two multi-plate clutch mechanisms 157,158 is fully engaged, the other multi-plate clutch mechanism is allowed to develop at least some slip.

To drive the multi-plate clutch mechanisms 157,158, a hydraulic circuit of the above-described construction (see FIGS. 1, 12, 13 and 14) is arranged.

Figure 20:
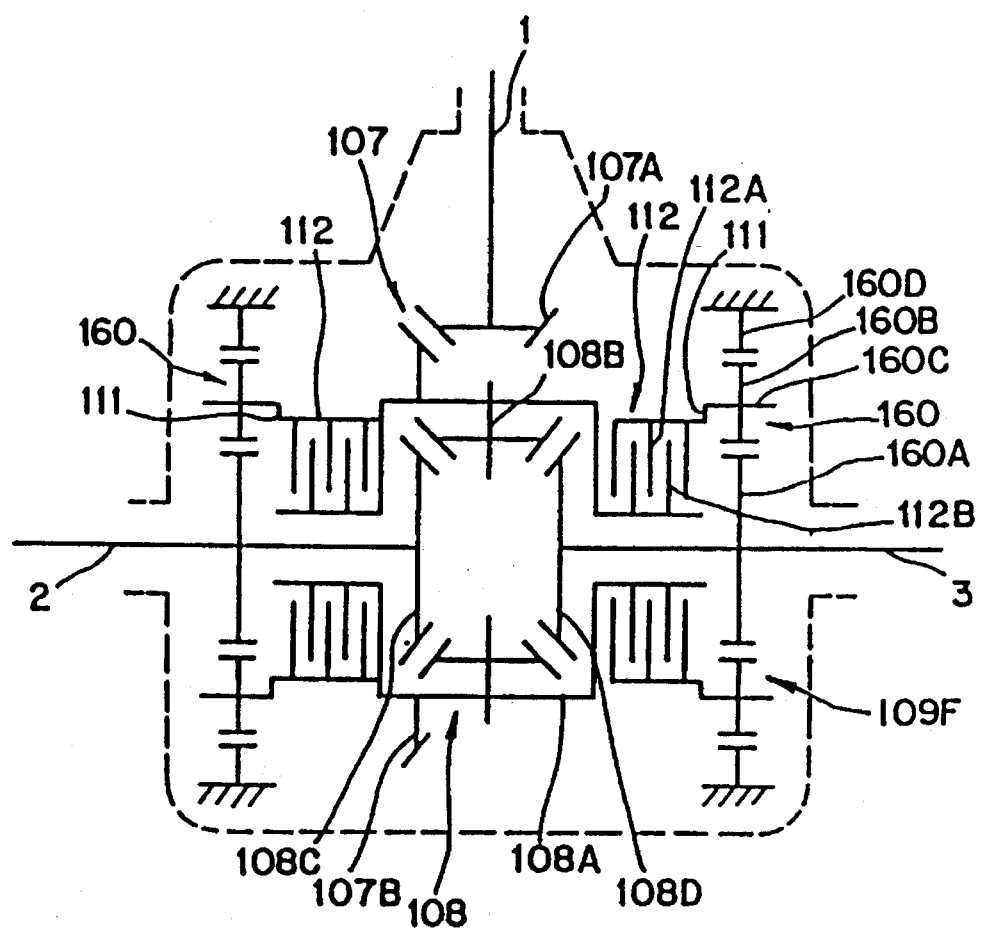
FIG. 20 is a schematic illustration of a further embodiment of such an apparatus.

In the modification shown in FIG. 20, there are provided, like the apparatus of the embodiment (see FIG. 15), the input shaft 1, to which rotational drive force is inputted, and the left-wheel axle 2 and right-wheel axle 3 adapted to output drive force inputted through the input shaft 1. Among these axles 2,3 and the input shaft 1, the vehicular left/right drive force adjusting apparatus is interposed.

Owing to the construction to be described below, a drive force transmission control mechanism 109F of the vehicular left/right drive force adjusting apparatus can distribute drive force at a desired ratio to the left-wheel axle 2 and the right-wheel axle 3 while permitting a differential motion between the left-wheel axle 2 and the right-wheel axle 3.

Between the left-wheel axle 2 and the input shaft 1 and between right-wheel axle 3 and the input shaft 1, shift mechanisms 160 and multi-plate clutch mechanisms 112 are interposed, respectively. A rotational speed of the left-wheel axle 2 or the right-wheel axle 3 is decreased by the corresponding shift mechanism 160 and is outputted to the hollow axle 111 as an output means (drive force transmitting auxiliary member) of the shift mechanism.

Each multi-plate clutch mechanism 112 is interposed between the hollow axle 111 and the differential case 108A on the side of the input shaft 1. By causing the multi-plate clutch mechanism 112 to engage, drive force is fed from the differential case 108A on the side of a higher speed to the hollow axle 111 on the side of a lower speed because, as a general characteristic of clutch plates disposed in a face-to-face relationship, transmission of torque takes place from a faster side to a slower side.

When the multi-plate clutch mechanism 112 between the right-wheel axle 3 and the input shaft 1 is caused to engage, for example, drive force to be distributed to the right-wheel axle 3 is increased through the direct route from the side of the input shaft 1 via the multi-plate clutch mechanism 112, and the drive force to be distributed to the left-wheel axle 2 is increased correspondingly.

Each shift mechanism 160 described above is constructed of a single planetary gear mechanism. This will be described next, taking as an example the shift mechanism 160 mounted on the right-wheel axle 3.

A sun gear 160A is fixed on the right-wheel axle 3. This sun gear 160A is meshed at an outer periphery thereof with a planetary gear (planetary pinion) 160B.

A pinion shaft 160C on which the planetary gear 160B is rotatably supported is supported for rotation on the hollow axle 111, so that the hollow axle 111 can function as a carrier for the planetary gear mechanism. The planetary gear 160B, on the other hand, is maintained in meshing engagement with a ring gear 160D which is fixed on a case of the drive force transmission control mechanism 109F or the like to prevent rotation.

In the planetary gear mechanism as described above, a revolution speed of the planetary gear 160B is lower than a corresponding rotational speed of the sun gear 160A so that the hollow axle (namely, an output portion of the shift mechanism 160) 111 rotates at a lower speed than the right-wheel axle 3. The shift mechanism 160 therefore functions as a speed-decreasing mechanism.

The clutch plates 112A therefore rotate at a lower speed than the clutch plates 112B. When the multi-plate clutch mechanism 112 is caused to engage, torque in an amount corresponding to the state of the engagement is fed from the side of the input shaft 1 to the side of the right-wheel axle 3.

The shift mechanism 160 and the multi-plate clutch mechanism 112, both mounted on the left-wheel axle 2, are constructed similarly. When it is desired to distribute drive torque from the input shaft 1 in a greater proportion to the left-wheel axle 2, the multi-plate clutch mechanism 112 on the side of the left-wheel axle 2 is caused to engage adequately in accordance with the amount to be distributed (distribution ratio). When it is desired to distribute more torque to the right-wheel axle 3, the multi-plate clutch mechanism 112 on the side of the right-wheel axle 3 is caused to engage properly in accordance with the distribution ratio.

Since each multi-plate clutch mechanism 112 is of the hydraulically driven type, the state of engagement of the multi-plate clutch mechanism 112 can be controlled by adjusting the level of hydraulic pressure so that the amount of drive force to be fed from the input shaft 1 to the left-wheel axle 2 or the right-wheel axle 3 (in other words, the left-to-right distribution ratio of drive force) can be adjusted with an adequate level of accuracy.

This modification is also designed so that the left and right multi-plate clutch mechanisms 112 are not brought into full engagement at the same time. Namely, it is designed that, when one of the left and right multi-plate clutch mechanisms 112 is fully engaged, the other multi-plate clutch mechanism 112 is allowed to develop at least some slip.

To drive the multi-plate clutch mechanisms 112, a hydraulic circuit of the above-described construction (see FIGS. 1, 12, 13 and 14) is provided.

Figure 21:
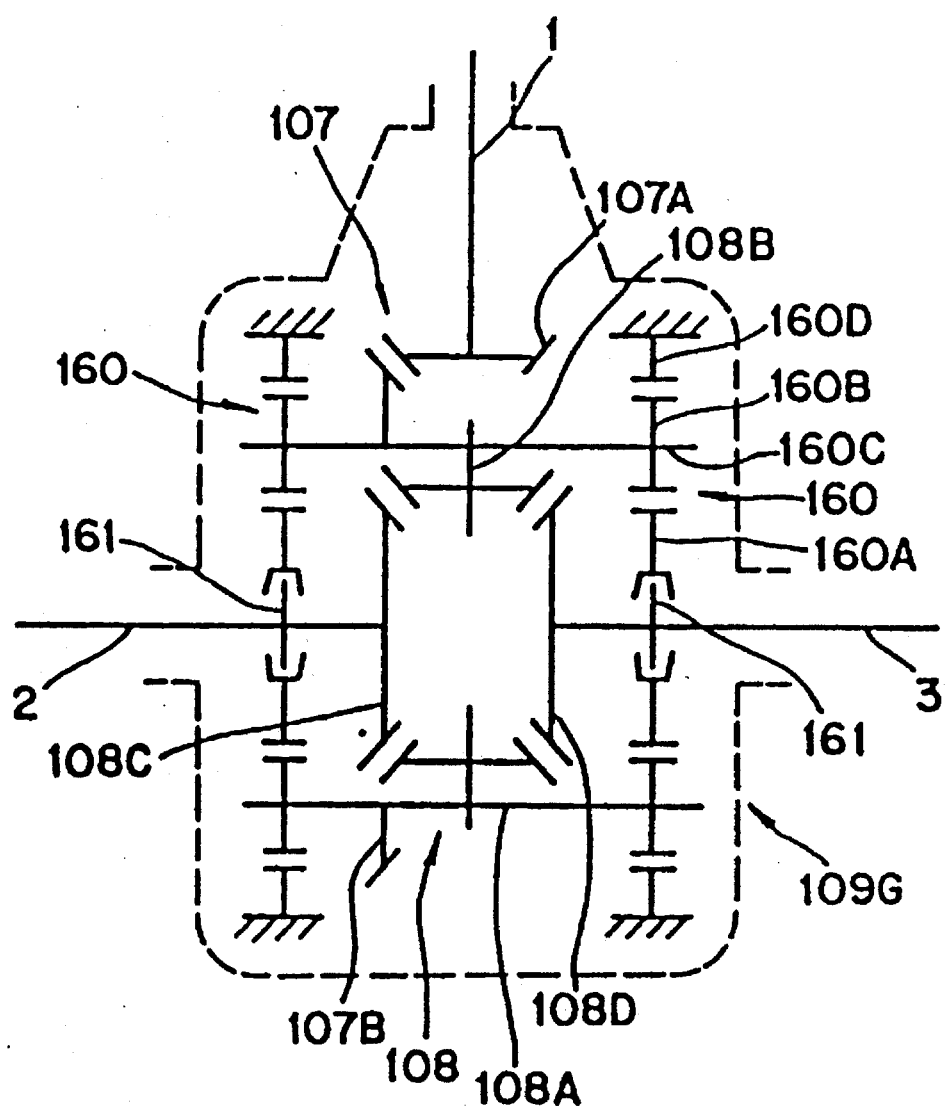
FIG. 21 is a schematic illustration of yet another embodiment of a left/right drive force adjusting apparatus.

In the modification shown in FIG. 21, there are provided, like the apparatus of the embodiment (see FIG. 15), the input shaft 1 and the first and right-wheel axles 2,3. Among the left-wheel axle 2, the right-wheel axle 3 and the input shaft 1, the vehicular left/right drive force adjusting apparatus is interposed.

The drive force transmission control mechanism 109G of the vehicular left/right drive force adjusting apparatus is provided with shift mechanisms 160 similar to those of the above-described apparatus (see FIG. 20). Each shift mechanism 160 is connected to the side of the input shaft 1 so that rotation on the side of the input shaft 1 is increased in speed and then outputted to the side of the axle 2 or 3.

In place of the multi-plate clutch mechanisms 112, couplings 161 such as friction clutches, for example, are interposed between output portions 160A of the shift mechanisms 160 and the axles 2,3, respectively. In the case of friction clutches, those capable of transmitting torque in one direction are arranged in a predetermined direction (in the torque transmitting direction thereof).

Each shift mechanism 160 is constructed of a single planetary gear mechanism. This will be described next, taking as an example the shift mechanism 160 mounted on the right-wheel axle 3. The sun gear 160A is fixed on one side (input side) of the coupling 161. This sun gear 160A is meshed at an outer periphery thereof with the planetary gear (planetary pinion) 160B. The pinion shaft 160C on which the planetary gear 160B is rotatably supported is supported for rotation on a carrier 160E disposed as an extension from the differential case 108A. The planetary gear 160B, on the other hand, is maintained in meshing engagement with the ring gear 160D which is fixed on a case of a drive force transmission control mechanism 109G or the like to prevent rotation.

In the planetary gear mechanism as described above, a revolution speed of the planetary gear 160B is lower than a corresponding rotational speed of the sun gear 160A so that the side of the sun gear 106A (namely, the output portion of the shift mechanism 160) rotates at a higher speed than the hollow axle 111. The shift mechanism 160 therefore functions as a speed-increasing mechanism.

When the coupling 161 mounted on the right-wheel axle 3 is caused to engage, torque in an amount corresponding to the state of the engagement is fed from the side of the input shaft 1 to the side of the right-wheel axle 3.

On the other hand, the shift mechanism 160 and the coupling 161, both mounted on the left-wheel axle 2, are constructed similarly. When it is desired to distribute drive torque from the input shaft 1 in a greater proportion to the left-wheel axle 2, the coupling 161 on the side of the left-wheel axle 2 is caused to engage adequately in accordance with the amount to be distributed (distribution ratio). When it is desired to distribute more torque to the right-wheel axle 3, the coupling 161 on the side of the right-wheel axle 3 is caused to engage properly in accordance with the distribution ratio.

By controlling the state of the engagement of the coupling 161, the amount of drive force to be fed from the input shaft 1 to the left-wheel axle 2 or the right-wheel axle 3 (in other words, the left-to-right distribution ratio of drive force) can be adjusted with an adequate level of accuracy.

This modification is also designed so that the left and right couplings 161 are not brought into full engagement at the same time. Namely, it is designed that, when one of the left and right coupling 161 is fully engaged, the other multi-plate clutch mechanism is allowed to develop at least some slip.

To drive the multi-plate clutch mechanisms 112, a hydraulic circuit of the above-described construction (see FIGS. 1, 12, 13 and 14) is provided.

Figure 22:
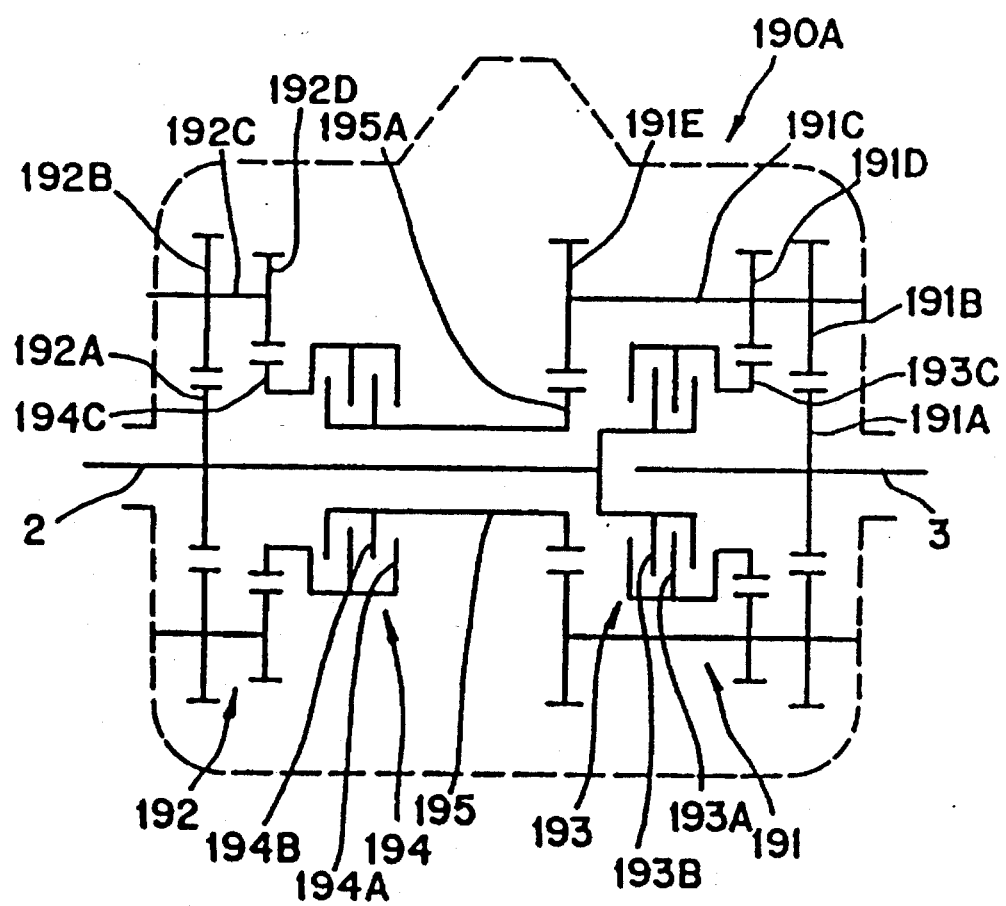
FIG. 22 is a schematic illustration of a left/right drive force adjusting apparatus applied to non-drive wheels of a vehicle.

The vehicular left/right drive force adjusting apparatus illustrated in FIG. 22 is disposed on the side of the rear wheels which are non-drive wheels, in other words, the wheels not applied with any engine output in a FWD vehicle. Its drive force transmission control mechanism 190A is arranged between the rear wheel axles 2 and 3. The drive force transmission control mechanism 109A of FIG. 16 has been applied to the non-drive wheels.

Although the rear wheel axles 2,3 are independent from each other, a shift mechanism 191 is provided on the side of the right-wheel axle 3 and a shift mechanism 192 is disposed on the side of the left-wheel axle 2. Between an output portion of the shift mechanism 191 and the left-wheel axle 2, a hydraulic multi-plate clutch mechanism 193 as a torque transmission mechanism of the variable transmitted power amount type is interposed. Further, between an output portion of the shift mechanism 192 and a hollow axle 195 rotatable at the same speed as and in association with the left-wheel axle 3, a hydraulic multi-plate clutch mechanism 194 controlled by the controller 18 as in the apparatus of the embodiment is interposed as a torque transmission mechanism of the variable transmitted power amount type. Incidentally, designated at 193A, 193B, 194A, and 194B are clutch plates.

Of these, the shift mechanism 191 is constructed of a sun gear 191A mounted for integral rotation with the right-wheel axle 3, a planetary gear 191B meshed with the sun gear 191A, a planetary gear 191D mounted on a planetary shaft 191C on which the planetary gear 191B is supported for rotation, said planetary gear 191D being rotatable integrally with the planetary gear 191B, and a sun gear 193C meshed with the planetary gear 191D.

The sun gear 193C is formed greater in diameter than the sun gear 191A, while the planetary gear 191D is formed greater smaller in diameter than the planetary gear 191B. The sun gear 193C therefore rotates at a lower speed than the sun gear 191A. As a consequence, the shift mechanism 191 decreases rotation of the right-wheel axle 3 and outputs it as rotation of the sun gear 193C.

When the hydraulic multi-plate clutch mechanism 193 is caused to engage, the clutch plate 193B on the side of the left-wheel axle 2 rotates faster than the clutch plate 193A on the side of the sun gear 193C so decreased in speed. Drive force is therefore transmitted from the side of the left-wheel axle 2 to the side of the sun gear 193C, that is, to the side of the right-wheel axle 3.

In this case, the left-wheel axle 2 and the right-wheel axle 3 are both the axles of the non-drive wheels, no drive force is fed thereto from the engine. However the left-wheel axle 2 gives rotational reaction force, which is received from the road surface, to the right-wheel axle 3. In other words, the left wheel connected to the left-wheel axle 2 applies brake force to the road surface and, in return, receives rotational reaction force from the road surface. The right wheel connected to the right-wheel axle 3, on the other hand, receives drive force from the side of the left-wheel axle 2 and applies it to the road surface. Since brake force is considered as negative drive force, the distribution of drive force between the left-wheel axle 2 and the right-wheel axle 3 can still be adjusted although the right and left wheels are non-drive wheels.

The shift mechanism 192, on the other hand, is constructed of a sun gear 192A mounted for integral rotation with the left-wheel axle 3, a planetary gear 192B meshed with the sun gear 192A, a planetary gear 192D mounted on a planetary shaft 192C on which the planetary gear 192B is supported for rotation, said planetary gear 192D being rotatable integrally with the planetary gear 192B, and a sun gear 194C meshed with the planetary gear 192D.

The sun gear 194C is formed greater in diameter than the sun gear 192A, while the planetary gear 192D is formed greater smaller in diameter than the planetary gear 192B. The sun gear 194C therefore rotates at a lower speed than the sun gear 192A. As a consequence, the shift mechanism 192 decreases rotation of the left-wheel axle 2 and outputs it as rotation of the sun gear 194C.

Further, a hollow axle 195 to which one of clutch plates of the hydraulic multi-plate clutch mechanism 194, that is, the clutch plates 194B are attached is associated with the right-wheel axle 3 via a sun gear 195A rotatable integrally with the hollow axle 195, a planetary gear 191E meshed with the sun gear 195A and mounted on the planetary shaft 191C, the planetary shaft 191C, the planetary gear 191B and the sun gear 191A.

The sun gear 195A is formed with the same diameter with the sun gear 191A while the planetary gear 191E is formed with the same diameter as the planetary gear 191B. The hollow axle 195 is therefore associated with the right-wheel axle 3 to normally rotate at the same speed as the right-wheel axle 3.

When the hydraulic multi-plate clutch mechanism 194 is caused to engage, the clutch plate 194B on the side of the hollow axle 195 (i.e., the right-wheel axle 3) rotates faster than the clutch plate 194A on the side of the sun gear 194C so decreased in speed. Drive force is therefore transmitted from the side of the right-wheel axle 3 to the side of the left-wheel axle 2.

In this case, both the left-wheel axle 2 and the right-wheel axle 3 are also the axles of the non-drive wheels, and no drive force is hence fed thereto from the engine. However the right-wheel axle 3 gives rotational reaction force, which is received from the road surface, to the left-wheel axle 2. In other words, the right wheel connected to the right-wheel axle 3 applies brake force to the road surface and, in return, receives rotational reaction force from the road surface. The left wheel connected to the left-wheel axle 2, on the other hand, receives drive force from the side of the right-wheel axle 3 and applies it to the road surface. Accordingly, the distribution of drive force between the left-wheel axle 2 and the right-wheel axle 3 can still be adjusted although the right and left wheels are non-drive wheels.

To drive the multi-plate clutch mechanisms 193, 194, a hydraulic circuit of the above-described construction (see FIGS. 1, 12, 13 and 14) is provided.

Figure 23:
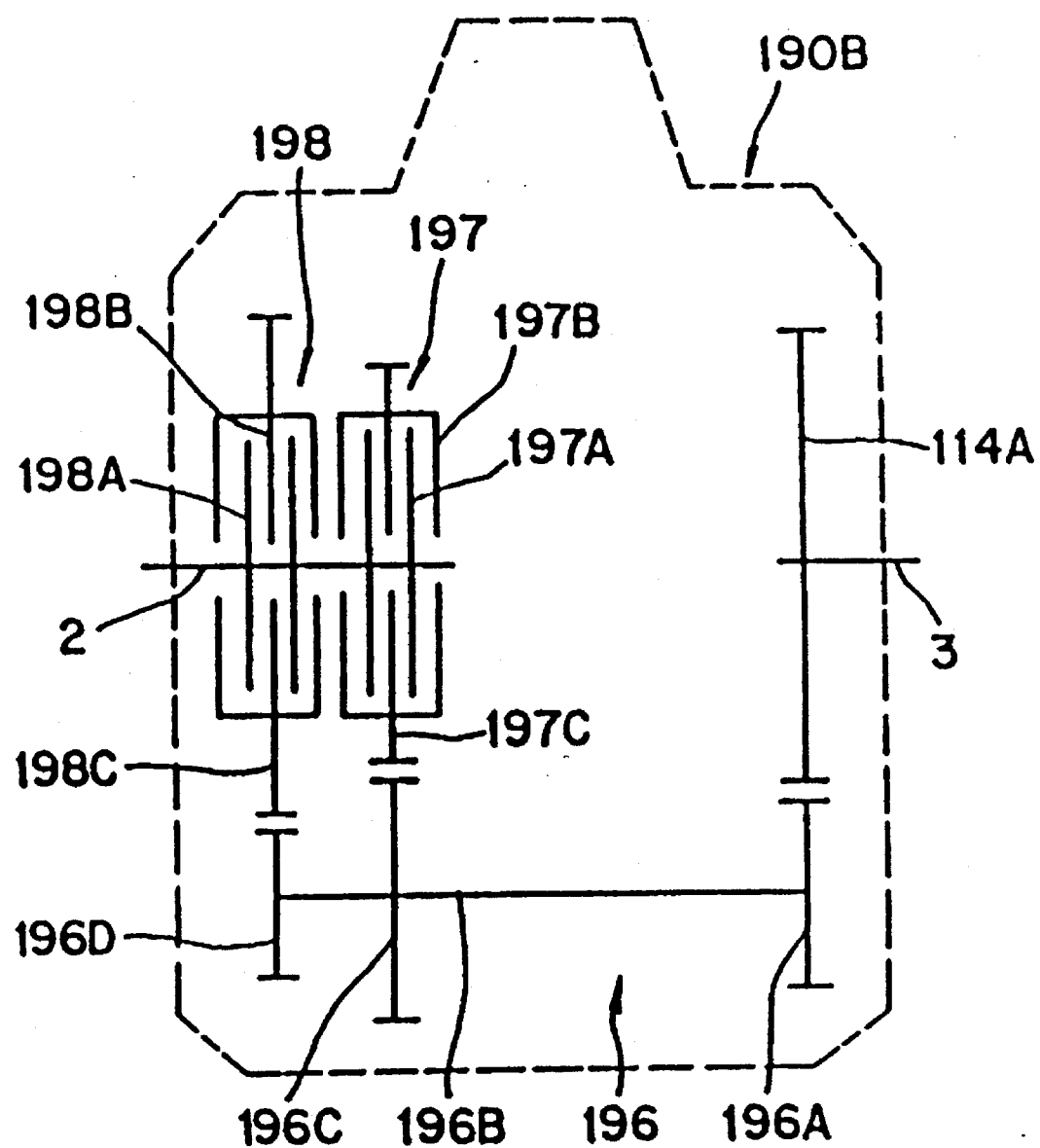
FIG. 23 is a schematic illustration of another embodiment of a left/right drive force adjusting apparatus applied to non-drive wheels of a vehicle.
Figure 24:
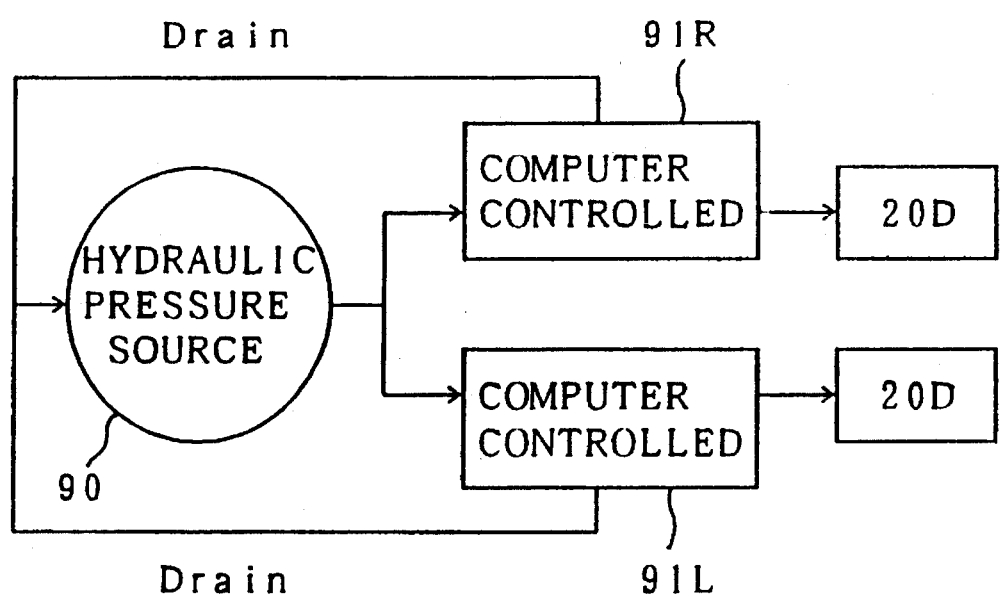
FIG. 24 is a schematic circuit diagram showing a hydraulic circuit construction for a vehicular left/right drive force adjusting apparatus, which construction was contemplated in the course of the completion of the present invention.

The vehicular left/right drive force adjusting apparatus illustrated in FIG. 23 is also disposed on the side of the rear wheels which are non-drive wheels in a front wheel drive car. Its drive force transmission control mechanism 190B is arranged between the rear wheel axles 2 and 3. The mechanism 109E shown in FIG. 17 has been applied to the non-drive wheels.

Although the rear wheel axles 2,3 are independent from each other as illustrated in FIG. 23, a shift mechanism 196 is provided between the axles 2 and 3. On the side of the left-wheel axle 2, a hydraulic multi-plate clutch mechanism 197 as a torque transmission mechanism of the variable transmitted power amount type is interposed between the left-wheel axle 2 and a speed-increased output portion of the shift mechanism 196 and, further, a hydraulic multi-plate clutch mechanism 198 as a torque transmission mechanism of the variable transmitted power amount type is interposed between the left-wheel axle 2 and a speed-decreased output portion of the shift mechanism 196.

The shift mechanism 196 is constructed of a gear 114A mounted on the right-wheel axle 3, a shaft (countershaft) 196B arranged in parallel with the axles 2,3, a gear 196A mounted on the countershaft 196B and meshed with the gear 114A, a gear 197C provided on the side of the left-wheel axle 2 via the hydraulic multi-plate clutch mechanism 197, a gear 198C provided on the side of the left-wheel axle 2 via the hydraulic multi-plate clutch mechanism 198, a gear 196C mounted on the countershaft 196B and meshed with the gear 197C, and a gear 196D mounted on the countershaft 196B and meshed with the gear 198C.

The gear 197C is formed smaller in diameter than the gear 114A, the gear 198C is formed greater in diameter than the gear 14A, the gear 196C is formed greater in diameter than the gear 196A, and the gear 196D is formed smaller in diameter than the gear 196A.

Accordingly, the gear 197C is transmitted with rotational force through a route of the gear 114A, the gear 196A, the gear 196C and the gear 197C and rotates at a higher speed than the gear 114A. The gear 197C therefore serves as the speed-increased output portion of the shift mechanism 196. The gear 198C is transmitted with rotational force through a route of the gear 114A, the gear 196A, the gear 196D and the gear 198C and rotates at a lower speed than the gear 114A. The gear 198C therefore serves as the speed-decreased output portion of the shift mechanism 196.

When the hydraulic multi-plate clutch mechanism 197 is caused to engage, the clutch plate 197A on the side of the left-wheel axle 2 rotates slower than a clutch plate 197B on the side of the gear 197C so increased in speed. Drive force is therefore transmitted from the side of the right-wheel axle 3 to the side of the left-wheel axle 2.

When the hydraulic multi-plate clutch mechanism 198 is caused to engage conversely, a clutch plate 198A on the side of the left-wheel axle 2 rotates faster than a clutch plate 198B on the side of the gear 198C so decreased in speed. Drive force is therefore transmitted from the side of the left-wheel axle 2 to the side of the right-wheel axle 3.

In this case, the left-wheel axle 2 and the right-wheel axle 3 are both the axles of the non-drive wheels, no drive force is fed thereto from the engine. However the axle 2 or 3 on the side that gives drive force receives rotational reaction force from the road surface and gives it to one of the axles, i.e., to the axle 3 or 2. In other words, the left or right wheel connected to the axle 2 or 3 on the side that gives drive force applies brake force to the road surface and, in return, receives rotational reaction force from the road surface. The right wheel or left wheel connected to the axle 3 or 2 on the side that receives drive force, on the other hand, receives the rotational reaction force and transmit it as drive force to the road surface.

To drive the multi-plate clutch mechanisms 197, 198, a hydraulic circuit of the above-described construction (see FIGS. 1, 12, 13 and 14) is provided.

In each of the apparatuses described above, hydraulic multi-plate clutch mechanisms are primarily used as torque transmission mechanisms of the variable transmitted power amount type. As such a torque transmission mechanism of the variable transmitted capacity control type, any clutch mechanisms can be used as long as they can vary and control the amount of torque to be transmitted and are of the hydraulic type. In addition to the mechanism exemplified above, a variety of torque transmission mechanism are considered useful.

For example, other couplings such as hydraulic friction clutches, controllable hydraulic VCUs (viscous coupling units) and controllable hydraulic HCUs (hydraulic coupling units=hydraulic couplings of the differential pump type) can also be used as torque transmission mechanisms of the variable transmitted power amount type.

In the case of these torque transmission mechanisms, use of the hydraulic circuit construction of the present invention (see FIGS. 1, 12, 13 and 14) also makes it possible to surely avoid such inconvenience that both the left and right hydraulic clutch mechanisms are simultaneously caused to engage or couple upon malfunction of a control system, sticking of a valve, or failure of a hydraulic system such as the proportional valve 74, the change-over valve 76, the electric pump 70 or the like. Coupling of the multi-plate clutch mechanism B is therefore prevented so that good running performance of a vehicle is assured and the mechanism can be protected from damage.

In each of the embodiment and modifications described above, the vehicular left/right drive force adjusting apparatus is applied to the rear wheels. Of course, such a left/right drive force adjusting apparatus can be applied to the front wheels. In the case of each of the apparatus of the above-described embodiment and those of FIGS. 16 through 21, in particular, the vehicular left/right drive force adjusting apparatus is applied to the drive system for the rear wheels of a 4WD vehicle. Such a left/right drive force adjusting apparatus can also be applied to the drive system of the front wheels of a 4WD vehicle, the drive system of the rear wheels of a RWD vehicle, the drive system of the front wheels of a FWD vehicle, or the like. Further, in the apparatus of each of FIGS. 22 and 23 described above, the vehicular left/right drive force adjusting apparatus is applied to the rear wheels as the non-drive wheels of the FWD vehicle. Such a left/right drive force adjusting apparatus can also be applied to the front wheels, that is, the non-drive wheels of a RWD vehicle.

INDUSTRIAL APPLICABILITY

As has been described in detail, each hydraulic circuit construction according to the present invention for a vehicular left/right drive force adjusting apparatus is suitably employed in an apparatus which serves to perform adjustment such as distribution of drive force between the left and right wheels of a vehicle led by an automotive vehicle such as a 4WD automotive vehicle.

The left and right wheels described above can be either driven wheels or non-drive wheels (driven wheels). If the left and right wheels are drive wheels, the apparatus for conducting the above-described adjustment of drive force (left/right drive force adjusting apparatus) can be interposed at an intermediate part of a drive force transmission system extending from an engine to the left and right drive wheels so that the distribution of drive force to be transmitted from the engine to the left and right drive wheels can be adjusted. If the left and right wheels are non-drive wheels, the above-described left/right drive force adjusting apparatus is installed between the left and right non-drive wheels irrespective of the output of the engine, whereby torque is transferred from one of the left and right non-drive wheels to the other, negative drive force (namely, brake force) is exhibited at one of the non-drive wheels and positive drive force is shown at the other non-drive wheel.

Further, these left/right drive force adjusting apparatus require, as a prerequisite, adjustment of drive force distribution by hydraulic torque transmission mechanisms.

The hydraulic circuit construction can be applied to both apparatuses for adjusting drive force between left and right drive wheels as described above and apparatuses for adjusting drive force between left and right non-drive wheels as described above.

The hydraulic circuit construction is suited especially for the accurate micro-adjustment of the state of transmission of torque by a hydraulic torque transmission mechanism. It is extremely suited where a hydraulic multi-plate clutch is employed as each hydraulic torque transmission mechanism.

We claim:

1. A hydraulic circuit construction for a vehicular left/right drive force adjusting apparatus having a pair of axles (2,3) integrally rotatable with left and right wheels, respectively, and a drive force transmission control mechanism (S) interposed between the left and right wheels characterized in that said drive force transmission control mechanism (S) comprises a left-wheel-controlling, hydraulically-driven multi-plate clutch mechanism (B) for transferring drive force to said left-wheel axle (2) or from said left-wheel axle (3), a right-wheel-controlling, hydraulically-driven multi-plate clutch mechanism (B) for transferring drive force to said right-wheel axle or from said right-wheel axle, and a hydraulic circuit for driving said clutch mechanisms (B,B); and said hydraulic circuit comprises hydraulic pressure adjusting means (74) for adjusting hydraulic pressure from a hydraulic pressure source (73) and outputting the hydraulic pressure so adjusted, hydraulic input means (20D) provided in association with said clutch mechanism (B) for inputting hydraulic pressure for the transmission of torque, and a change-over valve (76) interposed in lines extending from said hydraulic pressure adjusting means (74) to said hydraulic pressure input means (20D,20D) and capable of feeding hydraulic pressure to one of said hydraulic input means (20D,20D), wherein said change-over valve (76) is a 2-mode change-over valve which takes one of a communicating mode in which a predetermined hydraulic pressure from said hydraulic pressure adjusting means (74) is fed to one of said hydraulic pressure input means (20D, 20D) and another communicating mode in which the predetermined hydraulic pressure is fed to the other one of said hydraulic pressure input means (20D,20D), and aid change-over valve (76) comprises a spool (76A) movable back and forth in an axial direction, a spring (76C) for biasing said spool (76A) in a desired direction, and a solenoid (76B) for driving said spool (76A) against said spring (76C); said spool (76A) is provided with a first valve element (76a) for opening or closing said line to one of said hydraulic pressure input means (20D,20D) and a second valve element (76b) for opening or closing said line to the other hydraulic pressure input means; and a positional relationship between said first valve element (76a) and said second valve element (76b) is set so that said first valve element (76a) and said second valve element (76b) are not opened at the same time.

2. A hydraulic circuit construction for a vehicular left/right drive force adjusting apparatus having a pair of axles (2,3) integrally rotatable with left and right wheels, respectively, and a drive force transmission control mechanism (S) interposed between the left and right wheels characterized in that said drive force transmission control mechanism (S) comprises a left-wheel-controlling, hydraulically-driven multi-plate clutch mechanism (B) for transferring drive force to said left-wheel axle (2) or from said left-wheel axle (3), a right-wheel-controlling, hydraulically-driven multi-plate clutch mechanism (B) for transferring drive force to said right-wheel axle or from said right-wheel axle, and a hydraulic circuit for driving said clutch mechanisms (B,B); and said hydraulic circuit comprises hydraulic pressure adjusting means (74) for adjusting hydraulic pressure from a hydraulic pressure source (73) and outputting the hydraulic pressure so adjusted, hydraulic input means (20D) provided in association with said clutch mechanism (B) for inputting hydraulic pressure for the transmission of torque, and a change-over valve (110) interposed in lines extending from said hydraulic pressure adjusting means (74) to said hydraulic pressure input means (20D,20D) and capable of feeding hydraulic pressure to one of said hydraulic input means (20D,20D), wherein said change-over valve (110) is a 3-mode change-over valve which takes one of three modes consisting of a communicating mode in which a predetermined hydraulic pressure is fed from said hydraulic pressure adjusting means (74) to one of said hydraulic pressure input means (20D,20D), another communicating mode in which the predetermined hydraulic pressure is fed to the other one of said hydraulic pressure input means (20D,20D) and a closing mode in which the predetermined hydraulic pressure is fed to neither of the hydraulic pressure input means; and said change-over valve (110) is set to take the closing mode when said change-over valve (110) is in a neutral position in which no drive force is applied thereto.

3. A hydraulic circuit construction of claim 2 for the vehicular left/right drive force adjusting apparatus, wherein said change-over valve (110) comprises a spool (110A) movable back and forth in an axial direction, a pair of springs (110A) for biasing said spool (110A) from opposite ends thereof to the neutral position, a first solenoid (110A) for driving said spool (110A) so that said spool (110A) is biased toward one end thereof against said spring (110A), and a second solenoid (110A) for driving said spool (110A) so that said spool (110A) is biased toward the other end against the spring (110A); and said spool (110A) is provided with a first valve element (110A) for closing said line to one of said hydraulic pressure input means (20D,20D) when said spool (110A) is at the neutral position but for opening said line to said one of said hydraulic pressure input means (20D,20D) when said spool (110A) is at a position biased toward the one end thereof and with a second valve element (110A) for closing said line to the other one of said hydraulic pressure input means (20D,20D) when said spool (110A) is at the neutral position but for opening said line to the other one of said hydraulic pressure input means (20D,20D) when said spool (110A) is located at a position biased toward the other end thereof.

4. A hydraulic circuit construction of claim 1 for the vehicular left/right drive force adjusting apparatus, wherein said hydraulic pressure adjusting means (74) and said change-over valve (76) are accommodated within an oil compartment (82) in which working oil is stored, whereby said hydraulic pressure adjusting means and said change-over valve are submerged in the working oil.

5. The hydraulic circuit construction of claim 2 for the vehicular left/right drive force adjusting apparatus, wherein said hydraulic pressure adjusting means (74) and said change-over valve (110) are accommodated within an oil compartment (82) in which working oil is stored, whereby said hydraulic pressure adjusting means and said change-over valve are submerged in the working oil.

6. A hydraulic circuit construction for a vehicular left/right drive force adjusting apparatus having input means (1) for inputting drive force, a pair of left and right output axles (2,3) for outputting the drive force to left and right wheels, respectively, a differential mechanism S1 arranged between said input means (1) and said output axles (2,3), for distributing the drive force to said respective output axles (2,3) and permitting differential motion of said respective output axles (2,3), and a drive force transmission control mechanism (S) interposed between said input means and said respective output axles, characterized in that said drive force transmission control mechanism (S) comprises a left-wheel-side shift mechanism (A) for shifting a rotational speed of said left-wheel-side output axle (2), a right-wheel-side shift mechanism (A) for shifting a rotational speed of said right-wheel-side output axle (3), a left-wheel-controlling, hydraulically-driven multi-plate clutch mechanism (B) interposed between said left-wheel-side shift mechanism (A) and at least one said input means (1) and said right-wheel-side output axle (3) for transferring the drive force to said left-wheel-side output axle (2) or from said left-wheel-side output axle (2), a right-wheel-controlling, hydraulically-driven multi-plate clutch mechanism (B) interposed between said right-wheel-side shift mechanism (A) and at least one of said input means (1) and said left-wheel-side output axle (2) for transferring the drive force to said right-wheel-side output axle (3) or from said right-wheel-side output axle (3), and a hydraulic circuit for driving said clutch mechanisms (B,B); and said hydraulic circuit comprises hydraulic pressure adjusting means (74) for adjusting hydraulic pressure from a hydraulic pressure source (73) and outputting the hydraulic pressure so adjusted, hydraulic pressure input means (20D) provided in association with said left and right, clutch mechanisms (B) for inputting hydraulic pressure for the transmission of torque, and a change-over valve (76 or 110) interposed in lines extending from said hydraulic pressure adjusting means (74) to said hydraulic pressure input means (20D,20D) and capable of feeding hydraulic pressure to one of said hydraulic pressure input means (20D,20D).

7. A hydraulic circuit construction of claim 6 for the vehicular left/right drive force adjusting apparatus, wherein said change-over valve (76) is constructed of a 2-mode change-over valve which takes one of a communicating mode in which a predetermined hydraulic pressure from said hydraulic pressure adjusting means (74) is fed to one of said hydraulic pressure input means (20D,20D) and another communicating mode in which the predetermined hydraulic pressure is fed to the other one of said hydraulic pressure input means (20D,20D).

8. A hydraulic circuit construction of claim 7 for the vehicular left/right drive force adjusting apparatus, wherein said change-over valve (76) comprises a spool (76A) movable back and forth in an axial direction, a spring (76C) for biasing said spool (76A) in a desired direction, and a solenoid (76B) for driving said spool (76A) against said spring (76C); said spool (76A) is provided with a first valve element (76a) for opening or closing said line to one of said hydraulic pressure input means (20D,20D) and a second valve element (76b) for opening or closing said line to the other hydraulic pressure input means; and a positional relationship between said first valve element (76a) and said second valve element (76b) is set so that said first valve element (76a) and said second valve element (76b) are not opened at the same time.

9. A hydraulic circuit construction of claim 6 for the vehicular left/right drive force adjusting apparatus, wherein said change-over valve (110) is a 3-mode change-over valve which takes one of three modes consisting of a communicating mode in which a predetermined hydraulic pressure is fed from said hydraulic pressure adjusting means (74) to one of said hydraulic pressure input means (20D,20D), another communicating mode in which the predetermined hydraulic pressure is fed to the other one of said hydraulic pressure input means (20D,20D) and a closing mode in which the predetermined hydraulic pressure is fed to neither of the hydraulic pressure input means; and said change-over valve (110) is set to take the closing mode when said change-over valve (110) is in a neutral position in which no drive force is applied thereto.

10. A hydraulic circuit construction of claim 9 for the vehicular left/right drive force adjusting apparatus, wherein said change-over valve (110) comprises a spool (110A) movable back and forth in an axial direction, a pair of springs (110A) for biasing said spool (110A) from opposite ends thereof to the neutral position, a first solenoid (110A) for driving said spool (110A) so that said spool (110A) is biased toward one end thereof against said spring (110A), and a second solenoid (110A) for driving said spool (110A) so that said spool (110A) is biased toward the other end against the spring (110A); and said spool (110A) is provided with a first valve element (110A) for closing said line to one of said hydraulic pressure input means (20D,20D) when said spool (110A) is at the neutral position but for opening said line to said one of said hydraulic pressure input means (20D,20D) when said spool (110A) is at a position biased toward the one end thereof and with a second valve element (110A) for closing said line to the other one of said hydraulic pressure input means (20D,20D) when said spool (110A) is at the neutral position but for opening said line to the other one of said hydraulic pressure input means (20D,20D) when said spool (110A) is located at a position biased toward the other end thereof.

11. A hydraulic circuit construction of claim 6 for the vehicular left/right drive force adjusting apparatus, wherein said hydraulic pressure adjusting means (74) and said change-over valve (76 or 110) are accommodated within an oil compartment 82 in which working oil is stored, whereby said hydraulic pressure adjusting means and said change-over valve are submerged in the working oil.

* * * * *